(12) United States Patent
Xiong et al.

(10) Patent No.: US 12,135,438 B1
(45) Date of Patent: Nov. 5, 2024

(54) AUGMENTED OPTICAL IMAGE STABILIZATION USING FERROMAGNETIC MATERIALS

(71) Applicant: META PLATFORMS TECHNOLOGIES, LLC, Menlo Park, CA (US)

(72) Inventors: Yizhi Xiong, Foster City, CA (US); Honghong Peng, Mountain View, CA (US); Lidu Huang, Danville, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 472 days.

(21) Appl. No.: 17/579,130

(22) Filed: Jan. 19, 2022

Related U.S. Application Data

(63) Continuation of application No. 17/307,751, filed on May 4, 2021, now abandoned, and a continuation of application No. 17/307,758, filed on May 4, 2021, now abandoned.

(60) Provisional application No. 63/150,513, filed on Feb. 17, 2021, provisional application No. 63/115,542, filed on Nov. 18, 2020.

(51) Int. Cl.
   *G02B 27/64* (2006.01)
   *G03B 5/02* (2021.01)
   *G03B 17/12* (2021.01)

(52) U.S. Cl.
   CPC .......... *G02B 27/646* (2013.01); *G03B 5/02* (2013.01); *G03B 17/12* (2013.01); *G03B 2205/0069* (2013.01)

(58) Field of Classification Search
   None
   See application file for complete search history.

(56) References Cited

U.S. PATENT DOCUMENTS

| | | | | |
|---|---|---|---|---|
| 10,564,517 | B2* | 2/2020 | Sharma | G02B 27/646 |
| 2018/0139389 | A1* | 5/2018 | Park | H04N 23/51 |
| 2020/0116974 | A1* | 4/2020 | Saito | A61B 1/00096 |
| 2020/0174219 | A1* | 6/2020 | Sugawara | H04N 23/67 |
| 2021/0294070 | A1* | 9/2021 | Tanaka | G03B 13/36 |
| 2022/0035173 | A1* | 2/2022 | Min | G02B 7/08 |

(Continued)

FOREIGN PATENT DOCUMENTS

KR      20200074065 A * 6/2020  ............. G03B 30/00

*Primary Examiner* — Clayton E. LaBalle
*Assistant Examiner* — Diana Hancock
(74) *Attorney, Agent, or Firm* — Jordan IP Law, LLC

(57) ABSTRACT

A stabilization actuation assembly includes a lens barrel, a magnetic assembly, one or more stabilizing coils, an outer shell, and a piece of ferromagnetic material. The lens barrel is configured to carry a lens that is positioned along an optical axis. The magnetic assembly includes a plurality of magnets that produce a magnetic field. The one or more stabilizing coils are coupled to a printed circuit board below the plurality of magnets. The outer shell includes an aperture through which the lens barrel can actuate. The piece of ferromagnetic material is coupled to a surface of the outer shell and is positioned to augment the magnetic field. A current supplied to the one or more stabilizing coils interacts with the augmented magnetic field to cause the magnetic assembly together with the lens barrel to translate in a direction perpendicular to the optical axis.

20 Claims, 17 Drawing Sheets

(56) References Cited

U.S. PATENT DOCUMENTS

2022/0247931 A1* 8/2022 Mahmoudzadeh ......................... H02K 41/0356

* cited by examiner

FIG. 1A  FIG. 1B

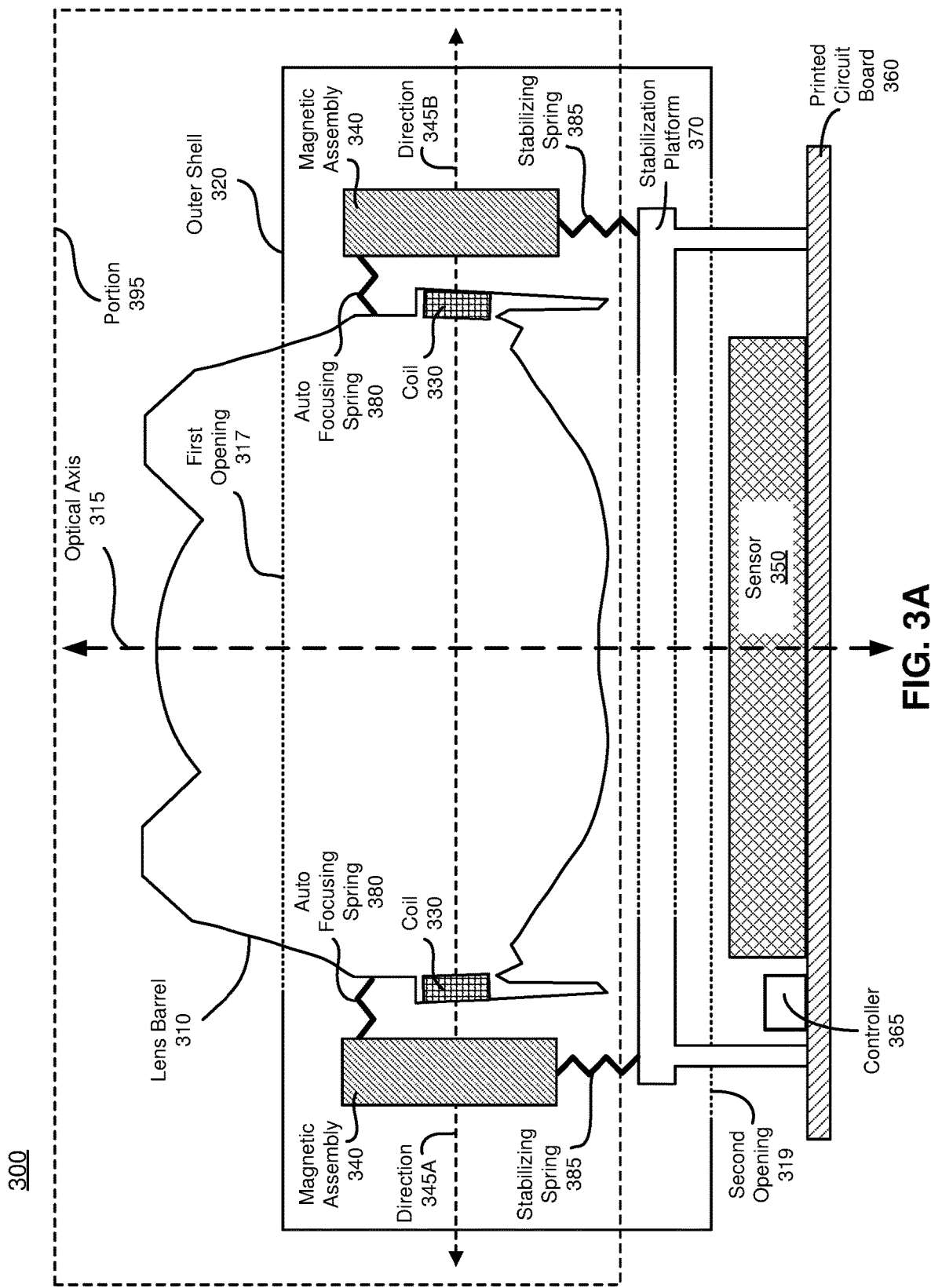

900

```
┌─────────────────────────────────────────────────────────────────────┐
│ Determine a plurality of different positions for a lens barrel      │
│ corresponding to one or more axes perpendicular to an optical axis  │
│                              910                                     │
└─────────────────────────────────────────────────────────────────────┘
                                  │
                                  ▼
┌─────────────────────────────────────────────────────────────────────┐
│ Provide instructions to a stabilization assembly including an amount│
│ of current to be supplied to one or more stabilizing coils such that a│
│ magnetic assembly together with the lens barrel moves into each of  │
│ the plurality of different positions along the one or more axes     │
│                              920                                     │
└─────────────────────────────────────────────────────────────────────┘
                                  │
                                  ▼
┌─────────────────────────────────────────────────────────────────────┐
│ Receive augmented magnetic field measurements from a magnetic       │
│ field sensor when the magnetic assembly together with the lens      │
│ barrel is positioned at each different position                     │
│                              930                                     │
└─────────────────────────────────────────────────────────────────────┘
                                  │
                                  ▼
┌─────────────────────────────────────────────────────────────────────┐
│ Calibrate an amount of current supplied to the one or more auto     │
│ focusing coils to cause translation of the lens barrel along the optical│
│                              axis                                    │
│                              940                                     │
└─────────────────────────────────────────────────────────────────────┘
```

FIG. 9

AUGMENTED OPTICAL IMAGE STABILIZATION USING FERROMAGNETIC MATERIALS

CROSS-REFERENCE TO RELATED APPLICATIONS

This application is a continuation of co-pending U.S. application Ser. No. 17/307,758, filed May 4, 2021, and a continuation of co-pending U.S. application Ser. No. 17/307,751, filed May 4, 2021, both of which claim the benefit of U.S. Provisional Application No. 63/150,513, filed Feb. 17, 2021, and U.S. Provisional Application No. 63/115,542, filed Nov. 18, 2020, all of which are incorporated by reference in their entirety.

FIELD OF THE INVENTION

This disclosure relates generally to optical image stabilization, and more specifically to augmenting optical image stabilization using ferromagnetic materials.

BACKGROUND

Electronic devices (e.g., smart phones) conventionally avoid having ferromagnetic materials near cameras as they can magnetize and affect operation of the camera. Additionally, electronic devices may include in addition to a camera with optical image stabilization (OIS) one or more components that utilize magnets in their operation. OIS typically employs one or more magnets to stabilize a camera lens relative to a camera sensor. Conventional electronic devices (e.g., smart phones, tablets, etc.) place other components having magnets (e.g., haptic devices) far enough away from the camera so that the external magnets do not interference with OIS. However, scaling electronic devices to smaller form factors is a problem, as external magnets would become close enough to the camera to have a negative impact on OIS.

SUMMARY

A stabilization assembly, such as an optical image stabilization (OIS) assembly, utilizes magnetic fields to adjust a positioning of one or more components in a camera device. The camera device may be placed in an electronic device (e.g., a smartwatch), one or more external magnetic fields (e.g., magnetic fields produced by other components of the electronic device) can affect the operation of the stabilization assembly. As such, the stabilization assembly may utilize one or more pieces of ferromagnetic materials to augment (e.g., offset and/or enhance) the magnetic fields. As such, a stabilization assembly utilizing one or more pieces of ferromagnetic materials is more power efficient using less current to stabilize an image being projected onto a sensor of the camera device.

In some embodiments, a stabilization assembly includes a lens barrel configured to carry a lens that is positioned along an optical axis. The stabilization assembly further includes a magnetic assembly that includes a plurality of magnets that produce a magnetic field. The stabilization assembly further includes one or more stabilizing coils coupled to a printed circuit board below the plurality of magnets. The stabilization assembly further includes an outer shell including an aperture through which the lens barrel can actuate. The outer shell at least partially encloses the one or more stabilizing coils. The stabilization assembly further includes a piece of ferromagnetic material that is coupled to a surface of the outer shell. The piece of ferromagnetic material is positioned to augment the magnetic field. Current supplied to the one or more stabilizing coils interacts with the augmented magnetic field to cause the magnetic assembly together with the lens barrel to translate in a direction perpendicular to the optical axis.

In some embodiments, a camera assembly includes a sensor configured to capture data describing a local area. The camera assembly further includes a stabilization assembly. The stabilization assembly includes a lens barrel configured to carry a lens that focuses light from the local area and is positioned along an optical axis. The stabilization assembly further includes a magnetic assembly that includes a plurality of magnets that produce a magnetic field. The stabilization assembly further includes one or more stabilizing coils coupled to a printed circuit board below the plurality of magnets. The stabilization assembly further includes an outer shell including an aperture through which the lens barrel can actuate. The outer shell at least partially encloses the one or more stabilizing coils. The stabilization assembly further includes a piece of ferromagnetic material that is coupled to a surface of the outer shell. The piece of ferromagnetic material is positioned to augment the magnetic field. Current supplied to the one or more stabilizing coils interacts with the augmented magnetic field to cause the magnetic assembly together with the lens barrel to translate in a direction perpendicular to the optical axis.

In some embodiments, a wearable device includes an external magnet that produces an external magnetic field. The wearable device further includes a camera assembly. The camera assembly includes a sensor configured to capture data describing a local area. The camera assembly further includes a stabilization assembly. The stabilization assembly includes a lens barrel configured to carry a lens that focuses light from the local area and is positioned along an optical axis. The stabilization assembly further includes a magnetic assembly that includes a plurality of magnets that produce a magnetic field. The stabilization assembly further includes one or more stabilizing coils coupled to a printed circuit board below the plurality of magnets. The stabilization assembly further includes an outer shell including an aperture through which the lens barrel can actuate. The outer shell at least partially encloses the one or more stabilizing coils. The stabilization assembly further includes a piece of ferromagnetic material that is coupled to a surface of the outer shell. Current supplied to the one or more stabilizing coils interacts with an augmented magnetic field to cause the magnetic assembly together with the lens barrel to translate in a direction perpendicular to the optical axis. The augmented magnetic field is based in part on the piece of ferromagnetic material and the external magnetic field.

BRIEF DESCRIPTION OF THE DRAWINGS

FIG. 3A is a cross section of an example camera assembly with a first lens barrel configuration, in accordance with one or more embodiments.

FIG. 9 is a flowchart illustrating a process for calibrating a focusing assembly of a camera assembly, in accordance with one or more embodiments.

Figure 1:
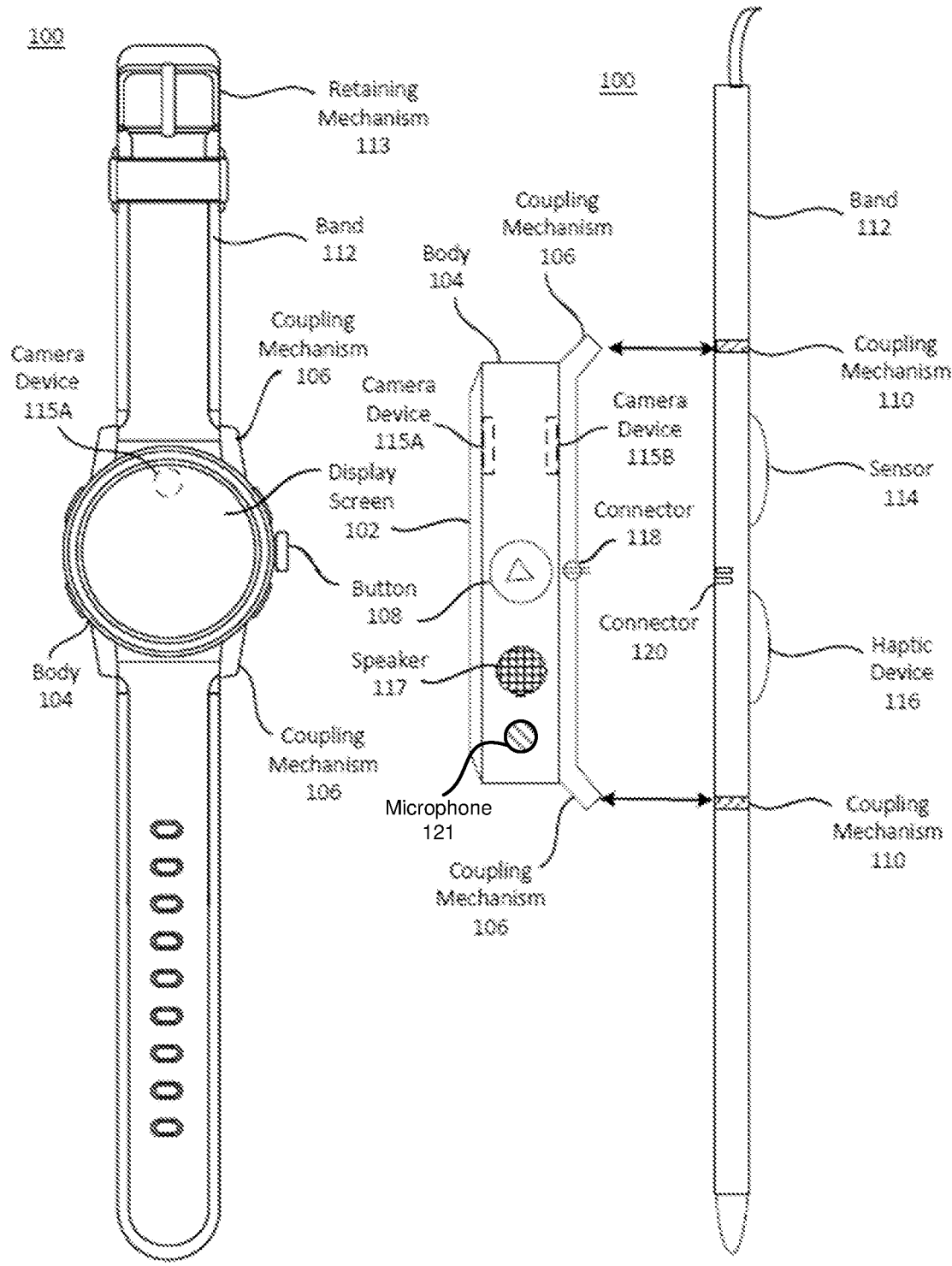
FIG. 1A is a top view of an example wristband system, in accordance with one or more embodiments.
FIG. 1B is a side view of the example wristband system of FIG. 1A.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A stabilization assembly is configured to move or adjust a positioning of one or more components of a device. The stabilization assembly may be incorporated into a camera device and move or adjust one or more lenses of the camera device in order to stabilize an image being projected onto a sensor of the camera device. In some embodiments, the stabilization assembly utilizes electromagnetism to move the lenses via a Lorentz force. The stabilization assembly may include a lens barrel, a magnetic assembly, one or more stabilizing coils, an outer shell, and one or more pieces of ferromagnetic materials. The lens barrel is configured to carry one or more lenses positioned along an optical axis. The one or more lenses may transmit light from a local area to the sensor of the camera device.

The stabilization assembly further includes the magnetic assembly that includes a plurality of magnets that produce a magnetic field. The magnetic assembly is configured to couple to the lens barrel and allow the lens barrel to translate in a positive or negative direction parallel to the optical axis. The outer shell includes an aperture through which the lens barrel can actuate. The one or more stabilizing coils are coupled to a printed circuit board (PCB) positioned below the plurality of magnets. The magnetic assembly is configured to translate in one or more directions perpendicular to the optical axis.

The one or more pieces of ferromagnetic material may couple to a surface of the outer shell. Each piece of ferromagnetic material may be positioned to augment the magnetic field (e.g., by enhancing the magnetic field). The current supplied to the one or more stabilizing coils interacts with the augmented magnetic field to cause the magnetic assembly together with the lens barrel to translate in one or more directions perpendicular to the optical axis. A stabilization assembly utilizing one or more pieces of ferromagnetic materials to augment the magnetic field is more power efficient using less current to stabilize the image being projected onto the sensor. During movement of the magnetic assembly and the lens barrel, the outer shell and the one or more stabilizing coils remain stationary. The assembly and the lens barrel move relative to the outer shell and the one or more stabilizing coils.

In some embodiments, the stabilization assembly utilizes shape-memory alloy (SMA) actuation to move the lenses of the camera device. The stabilization assembly may include a lens barrel, a platform, and a plurality of SMA wires. The lens barrel is configured to carry one or more lenses positioned along an optical axis. The one or more lenses may transmit light from a local area to a sensor of the camera device. The stabilization assembly further includes a platform positioned below the lens barrel along the optical axis. The platform is coupled to the lens barrel. The plurality of SMA wires are coupled to the platform. The current supplied to at least one pair of SMA wires of the plurality of SMA wires causes the platform together with the lens barrel to translate in a direction perpendicular to the optical axis. The translation of the lens barrel stabilizes an image projected onto the sensor.

The camera device that includes a stabilization assembly utilizing electromagnetism and/or SMA actuation may be incorporated into a small form factor electronic device, such as a wearable device. Examples of wearable devices include a smartwatch or a head-mount display (NMD). The electronic device can include other components (e.g., haptic devices, speakers, etc.) that may produce their own magnetic fields. And, the small form factor of the device provides limited space between the other components and the camera device. In some embodiments, the electronic device may have limited power supply (e.g., due to being dependent on a re-chargeable battery).

Conventional stabilization assemblies may include large footprints that do not take into consideration external magnetic fields produced by other components of the electronic device. The large footprints may be more cumbersome (e.g., have a larger weight), which is inconvenient to user of a wearable device. By not taking external magnetic fields into consideration, conventional stabilization assemblies may utilize increased amounts of power (thus, draining available power supplies of the device quickly) to move components. In contrast, the stabilization assembly embodiments described herein use one or more pieces of ferromagnetic materials and/or a plurality of SMA wires to move components. The external magnetic fields do not negatively affect the operation of the stabilization. Instead, in some embodiments, the external magnetic fields may assist in stabilizing an image projected onto a sensor of a camera device. The stabilization assembly embodiments provide a more efficient transfer of electrical power to translation of the lens barrel than that of conventional actuation assemblies. The stabilization assembly embodiments provide a small form factor easily being incorporated into the device. Additionally, due to their small form factor, other components of the device may be placed closer together, allowing for an even smaller form factor of a wearable device.

In some embodiments, the wearable device may operate in an artificial reality environment (e.g., a virtual reality environment). The camera device of the wearable device may be used to enhance an artificial reality application running on an artificial reality system (e.g., running on an HMD device worn by the user). The camera device may be disposed on multiple surfaces of the wearable device such that data from a local area, e.g., surrounding a wrist of the user, may be captured in multiple directions. For example, one or more images may be captured describing the local area and the images may be sent and processed by the HMD device prior to be presented to the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset, smartwatch, bracelet, etc.), a mobile device or computing system, or any other hardware platform capable of providing artificial reality content to one or more viewers.

FIG. 1A is a top view of an example wristband system 100, in accordance with one or more embodiments. FIG. 1B is a side view of the example wristband system 100 of FIG. 1A. The wristband system 100 is a wearable device and may be worn on a wrist or an arm of a user. In some embodiments, the wristband system 100 is a smartwatch. Media content may be presented to the user wearing the wristband system 100 using a display screen 102 and/or one or more speakers 117. However, the wristband system 100 may also be used such that media content is presented to a user in a different manner (e.g., via touch utilizing a haptic device 116). Examples of media content presented by the wristband system 100 include one or more images, video, audio, or some combination thereof. The wristband system 100 may operate in an artificial reality environment (e.g., a virtual reality environment, an augmented reality environment, a mixed reality environment, or some combination thereof).

In some examples, the wristband system 100 may include multiple electronic devices (not shown) including, without limitation, a smartphone, a server, a head-mounted display (HIMID), a laptop computer, a desktop computer, a gaming system, Internet of things devices, etc. Such electronic devices may communicate with the wristband system 100 (e.g., via a personal area network). The wristband system 100 may have sufficient processing capabilities (e.g., CPU, memory, bandwidth, battery power, etc.) to offload computing tasks from each of the multiple electronic devices to the wristband system 100. Additionally or alternatively, each of the multiple electronic devices may have sufficient processing capabilities (e.g., CPU, memory, bandwidth, battery power, etc.) to offload computing tasks from the wristband system 100 to the electronic device(s).

The wristband system 100 includes a watch body 104 coupled to a watch band 112 via one or more coupling mechanisms 106, 110. The watch body 104 may include, among other components, one or more coupling mechanisms 106, one or more camera devices 115 (e.g., camera device 115A and 115B), the display screen 102, a button 108, a connector 118, a speaker 117, and a microphone 121. The watch band 112 may include, among other components, one or more coupling mechanisms 110, a retaining mechanism 113, one or more sensors 114, the haptic device 116, and a connector 120. While FIGS. 1A and 1B illustrate the components of the wristband system 100 in example locations on the wristband system 100, the components may be located elsewhere on the wristband system 100, on a peripheral electronic device paired with the wristband system 100, or some combination thereof. Similarly, there may be more or fewer components on the wristband system 100 than what is shown in FIGS. 1A and 1B. For example, in some embodiments, the watch body 104 may include a port for connecting the wristband system 100 to a peripheral electronic device and/or to a power source. The port may enable charging of a battery of the wristband system 100 and/or communication between the wristband system 100 and a peripheral device. In another example, the watch body 104 may include an inertial measurement unit (IU) that measures a change in position, an orientation, and/or an acceleration of the wristband system 100. The IMU may include one or more sensors, such as one or more accelerometers, one or more gyroscopes, one or more magnetometers, another suitable type of sensor that detects motion, a type of sensor used for error correction of the IMU, or some combination thereof.

The watch body 104 and the watch band 112 may have any size and/or shape that is configured to allow a user to wear the wristband system 100 on a body part (e.g., a wrist). The wristband system 100 may include the retaining mechanism 113 (e.g., a buckle) for securing the watch band 112 to the wrist of the user. The coupling mechanism 106 of the watch body 104 and the coupling mechanism 110 of the watch band 112 may attach the watch body 104 to the watch band 112. For example, the coupling mechanism 106 may couple with the coupling mechanism 110 by sticking to, attaching to, fastening to, affixing to, some other suitable means for coupling to, or some combination thereof.

The wristband system 100 may perform various functions associated with the user. The functions may be executed independently in the watch body 104, independently in the watch band 112, and/or in communication between the watch body 104 and the watch band 112. In some embodiments, a user may select a function by interacting with the button 108 (e.g., by pushing, turning, etc.). In some embodiments, a user may select a function by interacting with the display screen 102. For example, the display screen 102 is a touchscreen and the user may select a particular function by touching the display screen 102. The functions executed by the wristband system 100 may include, without limitation, displaying visual content to the user (e.g., displaying visual content on the display screen 102), presenting audio content to the user (e.g., presenting audio content via the speaker 117), sensing user input (e.g., sensing a touch of button 108, sensing biometric data with the one or more sensors 114, sensing neuromuscular signals with the one or more sensors 114, etc.), capturing audio content (e.g., capturing audio with microphone 121), capturing data describing a local area (e.g., with a front-facing camera device 115A and/or a rear-facing camera device 115B), communicating wirelessly (e.g., via cellular, near field, Wi-Fi, personal area network, etc.), communicating via wire (e.g., via the port), determining location (e.g., sensing position data with a sensor 114), determining a change in position (e.g., sensing change(s) in position with an IMU), determining an orientation and/or acceleration (e.g., sensing orientation and/or acceleration data with an IMU), providing haptic feedback (e.g., with the haptic device 116), etc.

The display screen 102 may display visual content to the user. The displayed visual content may be oriented to the eye gaze of the user such that the content is easily viewed by the user. Traditional displays on wristband systems may orient the visual content in a static manner such that when a user moves or rotates the wristband system, the content may remain in the same position relative to the wristband system causing difficulty for the user to view the content. Embodiments of the present disclosure may orient (e.g., rotate, flip, stretch, etc.) the displayed content such that the displayed content remains in substantially the same orientation relative to the eye gaze of the user (e.g., the direction in which the user is looking). The displayed visual content may also be modified based on the eye gaze of the user. For example, in order to reduce the power consumption of the wristband system 100, the display screen 102 may dim the brightness of the displayed content, pause the displaying of video content, or power down the display screen 102 when it is determined that the user is not looking at the display screen 102. In some examples, one or more sensors 114 of the wristband system 100 may determine an orientation of the display screen 102 relative to an eye gaze direction of the user.

Embodiments of the present disclosure may measure the position, orientation, and/or motion of eyes of the user in a variety of ways, including through the use of optical-based eye-tracking techniques, infrared-based eye-tracking techniques, etc. For example, the front-facing camera device 115A and/or rear-facing camera device 115B may capture data (e.g., visible light, infrared light, etc.) of the local area surrounding the wristband system 100 including the eyes of the user. The captured data may be processed by a controller (not shown) internal to the wristband system 100, a controller external to and in communication with the wristband system 100 (e.g., a controller of an HMD), or a combination thereof to determine the eye gaze direction of the user. The display screen 102 may receive the determined eye gaze direction and orient the displayed content based on the eye gaze direction of the user.

In some embodiments, the watch body 104 may be communicatively coupled to an HMD. The front-facing camera device 115A and/or the rear-facing camera device 115B may capture data describing the local area, such as one or more wide-angle images of the local area surrounding the front-facing camera device 115A and/or the rear-facing camera device 115B. The wide-angle images may include hemispherical images (e.g., at least hemispherical, substantially spherical, etc.), 180-degree images, 360-degree area images, panoramic images, ultra-wide area images, or a combination thereof. In some examples, the front-facing camera device 115A and/or the rear-facing camera device 115B may be configured to capture images having a range between 45 degrees and 360 degrees. The captured data may be communicated to the HMD and displayed to the user on a display screen of the HMD worn by the user. In some examples, the captured data may be displayed to the user in conjunction with an artificial reality application. In some embodiments, images captured by the front-facing camera device 115A and/or the rear-facing camera device 115B may be processed before being displayed on the HMD. For example, certain features and/or objects (e.g., people, faces, devices, backgrounds, etc.) of the captured data may be subtracted, added, and/or enhanced before displaying on the HMD.

Figure 2:
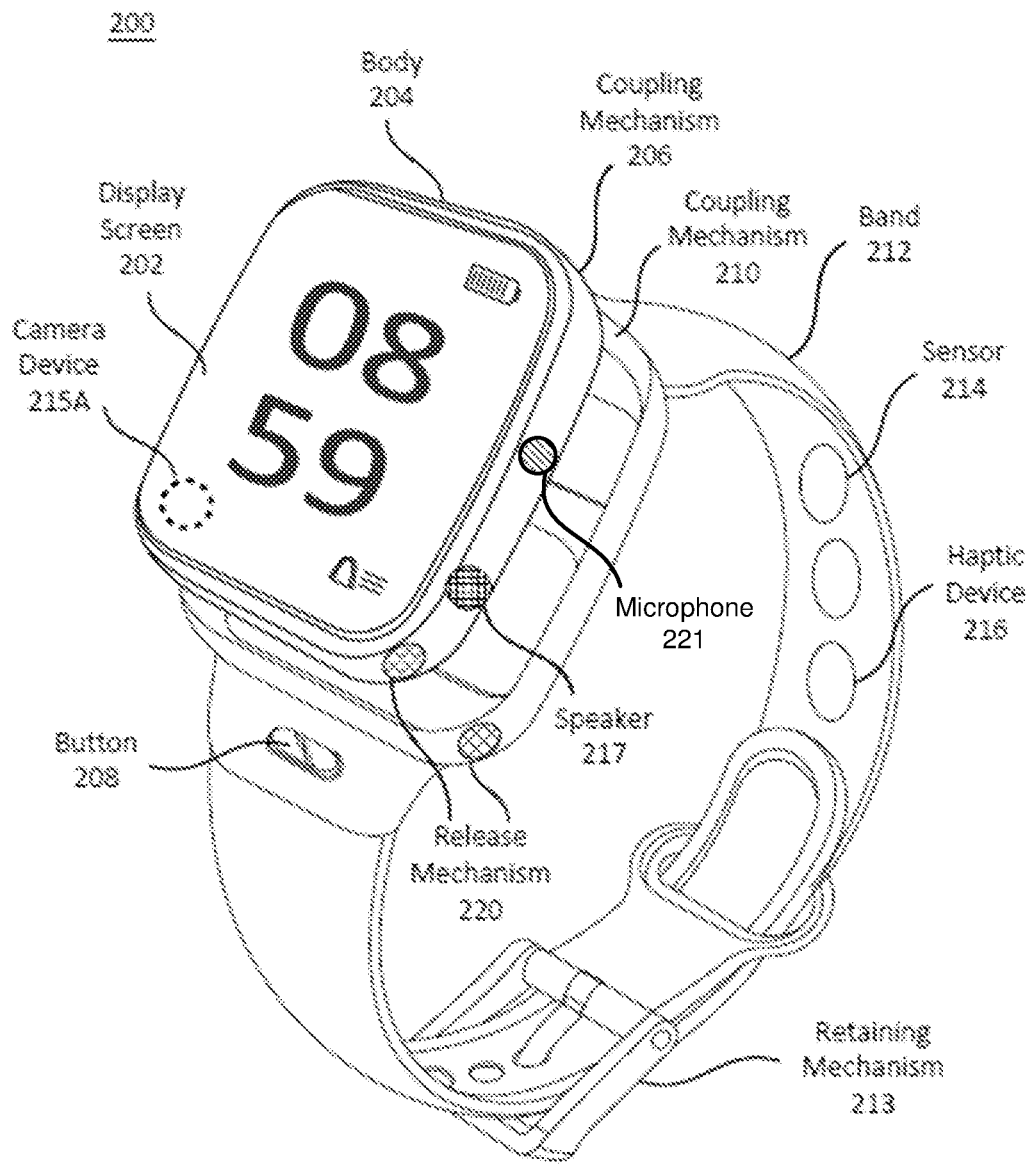
FIG. 2 is a perspective view of another example wristband system, in accordance with one or more embodiments.

FIG. 2 is a perspective view of another example wristband system 200, in accordance with one or more embodiments. The wristband system 200 includes many of the same components described above with reference to FIGS. 1A and 1, but a design or layout of the components may be modified to integrate with a different form factor. For example, the wristband system 200 includes a watch body 204 of a different shape and a watch band 212 with a different layout of components (e.g., a different location for a sensor 214 and a haptic device 216 on the watch band 212). FIG. 2 illustrates a coupling mechanism 206, a camera device 215A, a display screen 202, a button 108, a speaker 117, a microphone 221, and a release mechanism 220 associated with the watch body 204. FIG. 2 illustrates a coupling mechanism 210, a retaining mechanism 213, the sensor 114, the haptic device 116, and a release mechanism 220 associated with the watch band 212. In some embodiments, another camera device may be located on an underside of the watch body 204 and is not shown in FIG. 2. In some embodiments, one or more additional sensors 214 (not shown) may be included on the watch body 204 or the watch band 212.

The one or more camera devices 115 of wristband system 100 illustrated in FIGS. 1A and 1B and the camera devices 215 of wristband system 200 illustrated in FIG. 2 may include a stabilization assembly (e.g., an optical image stabilization (OIS) assembly) internal to the camera device. The stabilization assembly is configured to adjust a positioning of one or more components of the camera devices 115, 215. In some embodiments, the stabilization assembly adjusts the positioning by utilizing augmented magnetic fields. In some embodiments, the stabilization assembly adjusts the positioning by contracting/expanding one or more shape-memory alloy (SMA) wires. In some embodiments, the stabilization assembly utilizes both augmented magnetic fields and SMA wires. These position adjustments may enable the camera devices 115, 215 to capture data describing the local area that is of a better quality. For example, the stabilization assembly may adjust the positioning of one or more lenses (or entire lens barrel) of a camera device, thus capturing better focused (more stabilized) images of the local area. As the wristband system 100 and the wristband system 200 are of a small form factor to be easily and comfortably worn on a wrist of a user, the corresponding camera devices 115, 215 and various other components of the wristband system 100 described above are designed to be of an even smaller form factor and are positioned close to each other. A design configuration for a stabilization assembly that uses magnetic fields to cause movement of lenses and considers possible magnetic field interferences caused by external magnets (e.g., magnets included in the other components) is discussed in further detail in FIGS. 8A-8C. This stabilization assembly provides a power efficient operation. A design configuration for a stabilization assembly that uses one or more SMA wires to cause movement of lenses is discussed in further detail in FIGS. 7A and 7B. This stabilization assembly provides a small form factor that can easily fit and be incorporated into the wristband systems 100, 200.

FIG. 3A is a cross section of an example camera assembly 300 with a first lens barrel configuration, in accordance with one or more embodiments. The camera assembly 300 is an embodiment of the camera devices 115, 215. The camera assembly 300 may capture data (e.g., one or more images) of a local area surrounding the camera assembly. The camera assembly 300 shown in FIG. 3A includes a lens barrel 310, an outer shell 320, one or more auto focusing coils 330, a magnetic assembly 340, a sensor 350, a printed circuit board (PCB) 360, a controller 365, a stabilization platform 370, a plurality of restoring auto focusing springs 380, and a plurality of stabilizing springs 385. In alternative configurations, different and/or additional components may be included in the camera assembly 300. For example, in some embodiments, the camera assembly 300 may include a controller. In alternative embodiments, the controller may be part of some other system (e.g., a wristband system the camera assembly 300 is coupled to).

The camera assembly is configured to have both a focusing assembly and a stabilization assembly. The focusing assembly is configured to cause a translation of the lens barrel 310 in a direction parallel to the optical axis 315. The focusing assembly provides an auto focus functionality for the camera assembly 300. The focusing assembly includes the one or more auto focusing coils 330, a plurality of magnets included in the magnetic assembly 340, and the one or more restoring auto focusing springs 380. The stabilization assembly is configured to cause a translation of the lens barrel 310 (and, in some embodiments, the magnetic assembly 340 and the lens barrel 310) in one or more directions perpendicular to the optical axis 315. The stabilization assembly provides an optical image stabilization (OIS) functionality for the camera assembly 300 by stabilizing an image projected through the lens barrel 310 to the sensor 350. The stabilization assembly includes the lens barrel 310, the outer shell 320, the magnetic assembly 340, the stabilization platform 370, and the plurality of stabilizing springs 385. In some embodiments, the stabilization platform 370 includes one or more stabilizing coils, a plurality of shape-memory alloy (SMA) wires, or a combination of both. The focusing assembly and the stabilization assembly are controlled by the controller 365.

The lens barrel 310 is a mechanical structure or housing for carrying one or more lenses (not shown). The lens barrel 310 is a hollow structure with an opening on opposite ends of the lens barrel 310. The openings may provide a path for light (e.g., visible light, infrared light, etc.) to transmit between a local area and the sensor 350. Inside the lens barrel 310, one or more lenses are positioned between the two openings. The lens barrel 310 may be manufactured from a wide variety of materials ranging from plastic to metals. In some embodiments, one or more exterior surfaces of the lens barrel 310 are coated with a polymer (e.g., a sub-micron thick polymer).

Figure 4:
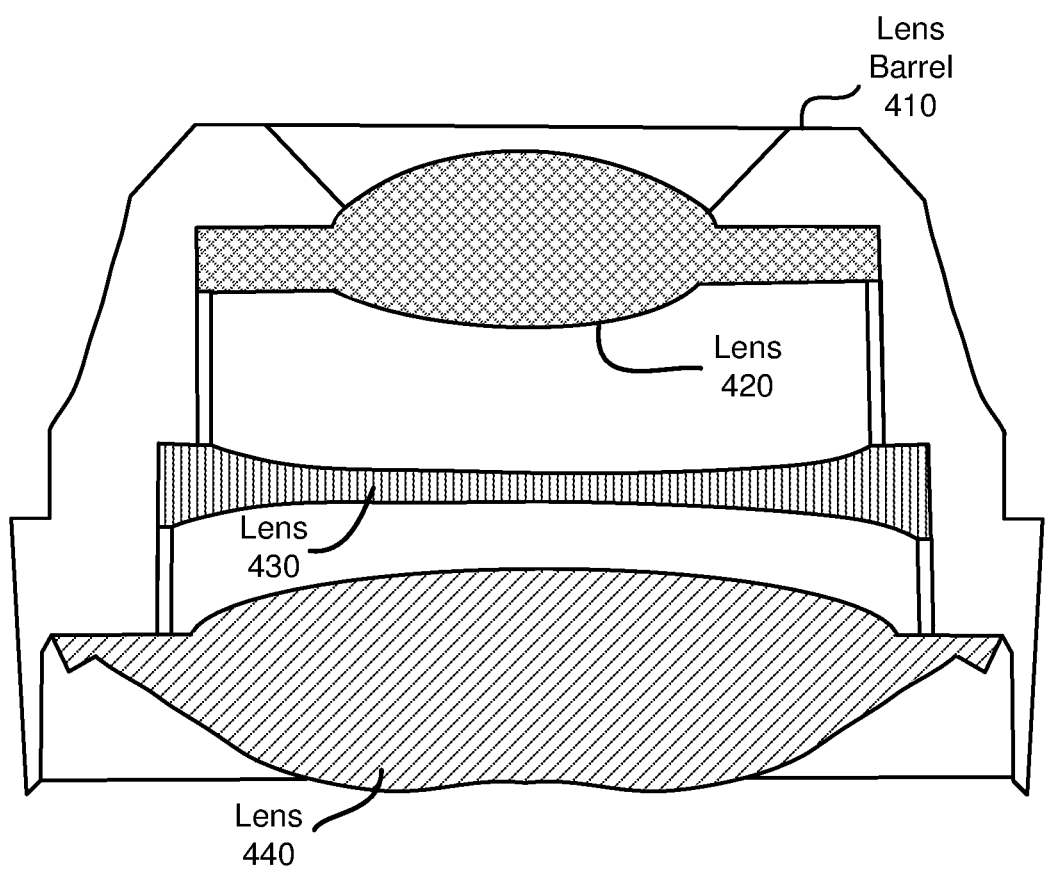
FIG. 4 is a cross-section of an example lens barrel, in accordance with one or more embodiments

The lens barrel 310 is rotationally symmetric about an optical axis 315 of the one or more lenses. An outside radius of the lens barrel 310 is measured from a point along the optical axis 315 to an exterior surface of the lens barrel 310. An inside radius of the lens barrel 310 is measured from a point along the optical axis 315 to an interior surface of the lens barrel 310. In some embodiments, the outside radii and the inside radii of the lens barrel 310 can vary. This embodiment is illustrated in FIG. 4. In alternative embodiments, the outside radii and the inside radii of the lens barrel 310 are constant.

The lens barrel 310, as illustrated in FIG. 3A, has a first lens barrel configuration. The first lens barrel configuration includes one or more auto focusing coils 330 directly coupled to the lens barrel 310. The coupling and the positioning of the one or more auto focusing coils 330 will be discussed in more detail below.

The lens barrel 310 is coupled to the magnetic assembly 340 by the plurality of restoring auto focusing springs 380. For example, the restoring auto focusing springs 380 are coupled to the lens barrel 310 and the magnetic assembly 340. In some embodiments, the magnetic assembly 340 is coupled to the outer shell 320. In another example (not illustrated), the restoring auto focusing springs 380 are coupled to the outer shell 320 directly and the lens barrel 310. The plurality of restoring auto focusing springs 380 are configured to control a positioning of the lens barrel 310 along the optical axis 315. For example, the plurality of restoring auto focusing springs 380 may control the positioning of the lens barrel 310 such that when current is not supplied to the one or more auto focusing coils 330 the lens barrel 310 is in a neutral position. In some embodiments, the restoring auto focusing springs 380 may be shape-memory alloy (SMA) wires. The neutral position of the lens barrel 310 is a positioning of the lens barrel 310 when the camera assembly 300 is not undergoing focusing (via the focusing assembly) nor stabilizing (via the stabilization assembly). The plurality of restoring auto focusing springs 380 can ensure the lens barrel 310 does not fall out of the first opening 317 or come into contact with the sensor 350 via the second opening 319. In some embodiments, the plurality of restoring auto focusing springs 380 are conductors and may be coupled to the one or more auto focusing coils 330. In these embodiments, the plurality of restoring auto focusing springs 380 may be used to provide current to the one or more auto focusing coils 330.

The outer shell 320 may enclose some of the components of the camera assembly 300 as illustrated in FIG. 3A. In other embodiments (not shown), the outer shell 320 may encloses all of the components of the camera assembly 300. As illustrated in FIG. 3A, the outer shell 320 partially encloses the lens barrel 310 and the stabilization platform 370. The outer shell 320 has a first opening 317 to accommodate the lens barrel 310 and a second opening 319 opposite the first opening. The outer shell 320 provides a space in which the lens barrel 310 can translate along the optical axis 315 and/or translate in a direction perpendicular to the optical axis 315. In some embodiments, the outer shell 320 provides a space in which the lens barrel 310 to rotate relative to one or more axes that are perpendicular to the optical axis 315. In some embodiments, the outer shell 320 may be rectangular-shaped as illustrated. In alternative embodiments, the outer shell 320 may be circular, square, hexagonal, or any other shape. In embodiments where the camera assembly 300 is part of another electronic device (e.g., a smartwatch), the outer shell 320 may couple to (e.g., be mounted on, affixed to, attached to, etc.) another component of the electronic device, such as a frame of the electronic device. For example, the outer shell 320 may be mounted on a watch body (e.g., the watch body 104) of the smartwatch. Various example of how the outer shell 320 may mount to a watch body is described in further detail in FIGS. 10A-10E. The outer shell 320 may be manufactured from a wide variety of materials ranging from plastic to metals. In some examples, the outer shell 320 is manufactured from a same material as the material of the electronic device the outer shell 320 is coupled to such that the outer shell 320 is not distinguishable from the rest of the electronic device. In some embodiments, the outer shell 320 is manufactured from a material that provides a magnetic shield to surrounding components of the electronic device. In these embodiments, the outer shell 320 may be a shield can. In some embodiments, one or more interior surfaces of the outer shell 320 are coated with a polymer similar to the lens barrel 310 described above.

The one or more auto focusing coils 330 are configured to conduct electricity by being supplied with a current. In the illustrated embodiment of FIG. 3A, the one or more auto focusing coils 330 are directly coupled to the lens barrel 310. For example, each coil 330 of the one or more auto focusing coils 330 comprises a first side in direct contact with (e.g., sits flush against) a surface of the lens barrel 310 and a second side opposite the first side. Each coil 330 has a curvature that conforms to a curvature of the lens barrel 310. In an embodiment, the one or more auto focusing coils 330 may be a single coil that circumscribes (e.g., wraps around) the lens barrel 310 a plurality of times. In another embodiment, the one or more auto focusing coils 330 may be any number of individual coils that are coupled to the lens barrel 310. The one or more auto focusing coils 330 may be positioned symmetrically about the optical axis 315. For example, the one or more auto focusing coils 330 may consist of two individual coils positioned symmetrically about the optical axis 315.

The magnetic assembly 340 includes a magnet holder for holding a plurality of magnets. The magnet holder may provide a rigid structure to support the plurality of magnets. In some embodiments, the magnet holder may enclose all sides of the magnets. In other embodiments, the magnet holder may enclose all sides of the magnets except for a side facing the one or more auto focusing coils 330. In some embodiments, one or more exterior surfaces of the magnetic assembly 340 are coated with a polymer similar to the lens barrel 310 described above.

The magnetic assembly 340 is coupled to one or more components of the camera assembly 300 via the plurality of stabilizing springs 385, such that the magnetic assembly 340 is free to actuate along axes perpendicular to the optical axis 315. The plurality of stabilizing springs 385 are configured to control a positioning of the magnetic assembly 340 with the lens barrel 310 in one or more directions perpendicular to the optical axis 315.

In some embodiments, the plurality of stabilizing springs 385 may control the positioning of the magnetic assembly 340 with the lens barrel 310 such that when current is not supplied to one or more components of the stabilization platform 370 (e.g., to one or more stabilizing coils and/or to the plurality of SMA wires) the magnetic assembly 340 and the lens barrel 310 are in the neutral position. The plurality of stabilizing springs 385 are designed such that a spring force is large enough to return the magnetic assembly 340 and the lens barrel 310 to the neutral position without actuation of (e.g., without any current being supplied to) one or more components of the stabilization platform 370.

As illustrated in FIG. 3A, the magnetic assembly 340 is coupled to the stabilization platform 370 via the plurality of stabilizing springs 385. In alternative embodiments (not shown), the plurality of restoring auto focusing springs 380 are coupled to the magnetic assembly 340 and to the plurality of stabilizing springs 385, and the plurality of stabilizing springs 385 are coupled to the stabilization platform 370, the sensor 350, and/or the PCB 360. An example embodiment of a camera assembly with the plurality of restoring auto focusing springs 380 being coupled to the magnetic assembly 340 and to the plurality of stabilizing springs 385, and the plurality of stabilizing springs 385 being coupled to the stabilization platform 370 is described in further detail in FIG. 5.

The plurality of magnets of the magnetic assembly 340 generate magnetic fields that can be used for translating the lens barrel 310 along the optical axis 315 (e.g., focusing the camera assembly 300) and/or perpendicular to the optical axis 315 (e.g., providing optical image stabilization (OIS) for the camera assembly 300). Each magnet of the plurality of magnets may be a different size or the same size. In some embodiments, each magnet is curved about the optical axis 315 conforming to the curvature of the one or more auto focusing coils 330 and the lens barrel 310. In some embodiments, each magnet is straight. For example, at least two opposing sides of each magnet are parallel to a plane that is parallel to the optical axis 315. Each magnet of the plurality of magnets may include rectangular cross sections with one axis of a cross section being parallel to the optical axis 315 and another axis of the cross section being perpendicular to the optical axis 315. In some embodiments, each magnet may include other types of cross sectionals shapes such as square or any other shape that includes at least one straight-edged side that faces the one or more auto focusing coils 330. Each magnet is a permanent magnet that is radially magnetized with respect to the optical axis 315. For example, a magnet of the plurality of magnets has a direction of magnetization 345A extending radially outward from a center point that is positioned in a center of the lens barrel 310 and another magnet has a direction of magnetization 345B extending radially outward from the center point. The magnets may be positioned symmetrically about the optical axis 315.

The sensor 350 captures data (e.g., one or more images) describing a local area. The sensor 350 may include one or more individual sensors, e.g., an image sensor, a photodetector, a CMOS sensor, a CCD sensor, some other device for detecting light, or some combination thereof. The individual sensors may be in an array. For a camera assembly 300 integrated into an electronic device, the local area is an area surrounding the electronic device. The sensor 350 captures light from the local area. The sensor 350 may capture visible light and/or infrared light from the local area surrounding the electronic device. The visible and/or infrared light is focused from the local area to the sensor 350 via the lens barrel 310. The sensor 350 may include various filters, such as infrared cut-off filters (IRCFs).

The stabilization platform 370 causes the lens barrel 310 to translate in one or more directions perpendicular to the optical axis 315. In some embodiments, the stabilization platform 370 causes the magnetic assembly 340 together with the lens barrel 310 to translate in one or more directions perpendicular to the optical axis 315. The stabilization platform 370 is positioned below the lens barrel 310 along the optical axis 315. The stabilization platform 370 is stationary and coupled to the PCB 360. The stabilization platform 370 may include an aperture on a top side and a bottom side. The aperture allows light to travel from the lens barrel 310 to the sensor 350. In some embodiments, one or more surfaces of the stabilization platform 370 are coated with a polymer similar to the lens barrel 310 described above.

In some embodiments, a magnetic field sensor (not shown) may be coupled to the stabilization platform 370. The magnetic field sensor (e.g., a Hall-effect sensor, a tunnel magnetoresistance (TMR) sensor, etc.) may be configured to measure a magnetic field when the lens barrel 310 is positioned at a plurality of different positions relative to the optical axis. For example, the magnetic field sensor may be used during a calibration process performed by the camera assembly 300. The calibration process is discussed in further detail in FIG. 9. In some embodiments, a position sensor (not shown) may be coupled to the stabilization platform 370. The position sensor may be configured to measure a position of the lens barrel 310.

In some embodiments, the stabilization platform 370 may include one or more stabilizing coils. The one or more stabilizing coils are configured to conduct electricity by being supplied with a current. As described in more detail below, when current is supplied to the one or more stabilizing coils, the magnetic assembly 340 together with the lens barrel 310 move in one or more directions perpendicular to the optical axis 315. An example stabilization platform 370 with one or more stabilizing coils is described in more detail in FIGS. 5 and 6.

In some embodiments, the stabilization platform 370 may include a plurality of SMA wires coupled to a translational platform (not shown). In this embodiment, the translational platform is configured to be movable in one or more directions perpendicular to the optical axis 315 and to be coupled to the lens barrel 310. Each SMA wire is configured to contract when being supplied current. As described in more detail below, when current is supplied to one or more SMA wires of the plurality of SMA wires, the translational platform and the lens barrel 310 move in one or more directions perpendicular to the optical axis 315. An example stabilization platform 370 with a plurality of SMA wires and a translational platform is described in more detail in FIGS. 7A and 7B.

The PCB 360 is positioned below the sensor 350 along the optical axis 315. The PCB 360 is a stationary component of the camera assembly 300 and provides mechanical support (e.g., by acting as a base) for the camera assembly 300. The PCB 360 is coupled to the stabilization platform 370. The PCB 360 may provide electrical connections for one or more components of the camera assembly 300. In some embodiments, the controller 365 may be located on the PCB 360 and the PCB 360 electrically connects the controller 365 to various components (e.g., the one or more focusing coils 330 of the focusing assembly, the one or more stabilizing coils of the stabilization assembly, and/or the SMA wires of the stabilization assembly) of the camera assembly 300. In other embodiments (not shown), the controller 365 may be located in a different location within the camera assembly 300 or external to the camera assembly 300.

The controller 365 may control various components of the camera assembly 300 including the sensor 350, the focusing assembly, and/or the stabilization assembly. For example, the controller 365 may be configured to determine a position of the lens barrel 310 along one or more axes perpendicular to the optical axis 315 needed to focus light from the local area onto the sensor 350 such that data is captured by the sensor 350 (e.g., an image is captured by the sensor 350). In some embodiments, the controller 365 may provide instructions to the stabilization assembly including an amount of current to supply to the one or more stabilizing coils such that the magnetic assembly 340 together with the lens barrel 310 moves into the position. In other embodiments, the controller 365 may provide instructions to the stabilization assembly including an amount of current to supply to one or more SMA wires such that the lens barrel 310 moves into the position.

During the calibration process of the camera assembly 300, the controller 365 may be configured to determine a plurality of different positions for the lens barrel 310 corresponding to one or more axes perpendicular to the optical axis 315. In some embodiments, the controller 365 may provide instructions to the stabilization assembly including an amount of current to supply to the one or more stabilizing coils such that the magnetic assembly 340 together with the lens barrel 310 moves into each of the plurality of different positions. The controller 365 may calibrate an amount of current supplied to the one or more auto focusing coils 330 to cause translation of the lens barrel 310 along the optical axis 315.

During operation of the focusing assembly of the camera assembly 300, the controller 365 may control an amount and/or a polarity (e.g., a direction) of current applied to the one or more auto focusing coils 330 in order to translate the lens barrel 310 in a positive or negative direction parallel to the optical axis 315 and provide auto focusing functionality. Due to the Lorentz force principle, when current flows through the one or more auto focusing coils 330 and passes the magnetic fields generated by the plurality of magnets of the magnetic assembly 340, an orthogonal Lorentz force is created. The Lorentz force drives the one or more auto focusing coils 330 to move orthogonally relative to the plurality of magnets. For example, by driving a particular amount of current through the one or more auto focusing coils 330, a magnetic field is produced that causes the one or more auto focusing coils 330 to move relative to the plurality of magnets 340, thereby causing the lens barrel 310 coupled to the one or more auto focusing coils 330 to move. In some embodiments, the current is supplied to the one or more auto focusing coils 330 via the plurality of restoring auto focusing springs 380.

During operation of the stabilization assembly of the camera assembly 300, the controller 365 may control an amount and/or a polarity (e.g., a direction) of current applied to one or more components of the stabilization platform 370. In some embodiments, where the stabilization platform 370 includes one or more stabilizing coils, current is supplied to the one or more stabilizing coils in order to translate the magnetic assembly 340 and the lens barrel 310 in one or more directions perpendicular to the optical axis 315 in order to offset motion and perform OIS functionality for the camera assembly 300. In these embodiment, where current is applied to one or more stabilizing coils, due to the Lorentz force principle, the current flows through the one or more stabilizing coils and passes the magnetic fields generated by the plurality of magnets of the magnetic assembly 340 and an orthogonal Lorentz force is created. The Lorentz force drives the magnetic assembly 340 (and the lens barrel 310) to move orthogonally relative to the one or more stabilizing coils. For example, by driving a particular amount of current through the one or more stabilizing coils, a magnetic field is produced that causes the magnetic assembly 340 to move relative to the one or more stabilizing coils, thereby causing the lens barrel 310 coupled to the magnetic assembly 340 to move.

In embodiments, where the stabilization platform 370 includes a plurality of SMA wires, current is supplied to one or more SMA wires in order to translate the lens barrel 310 in one or more directions perpendicular to the optical axis 315 in order to offset motion of the camera assembly 300 (e.g., by performing OIS functionality). As current is supplied to an SMA wire, the wire contracts or otherwise changes shape and/or size causing a translational platform of the stabilization platform 370 to move in a direction perpendicular to the optical axis 315, thereby causing the lens barrel 310 coupled to the translational platform to move.

The camera assembly 300 may experience an impact or shock event (e.g., when the camera assembly 300 is dropped and strikes a surface). As components of the camera assembly 300 are jostled and moved around due to the event, various components may impact each other causing particles to generate. For example, the lens barrel 310 may strike against the outer shell 320, the stabilization platform 370, the magnetic assembly 340, the sensor 350, or any combination thereof causing particles of any or all of the components to break off and land on the sensor 350 (e.g., land on an IRCF filter of the sensor 350). The particles may cause blurs and/or spots in captured images. As described above, various components of the camera assembly 300 may be coated to prevent particle generation. For example, the lens barrel 310, the outer shell 320, the magnetic assembly 340, and/or the stabilization platform 370 may be coated with a polymer. In some embodiments, the coating may be a plasma enhanced chemical vapor deposition (PECVD) coating.

As illustrated in FIG. 3A, a portion 395 of the camera assembly 300 includes the lens barrel 310, a portion of the outer shell 320, the one or more auto focusing coils 330, the magnetic assembly 340, and the plurality of restoring auto focusing springs 380. The portion 395 of the camera assembly 300 is described in further detail in FIG. 3C.

Figure 3B:
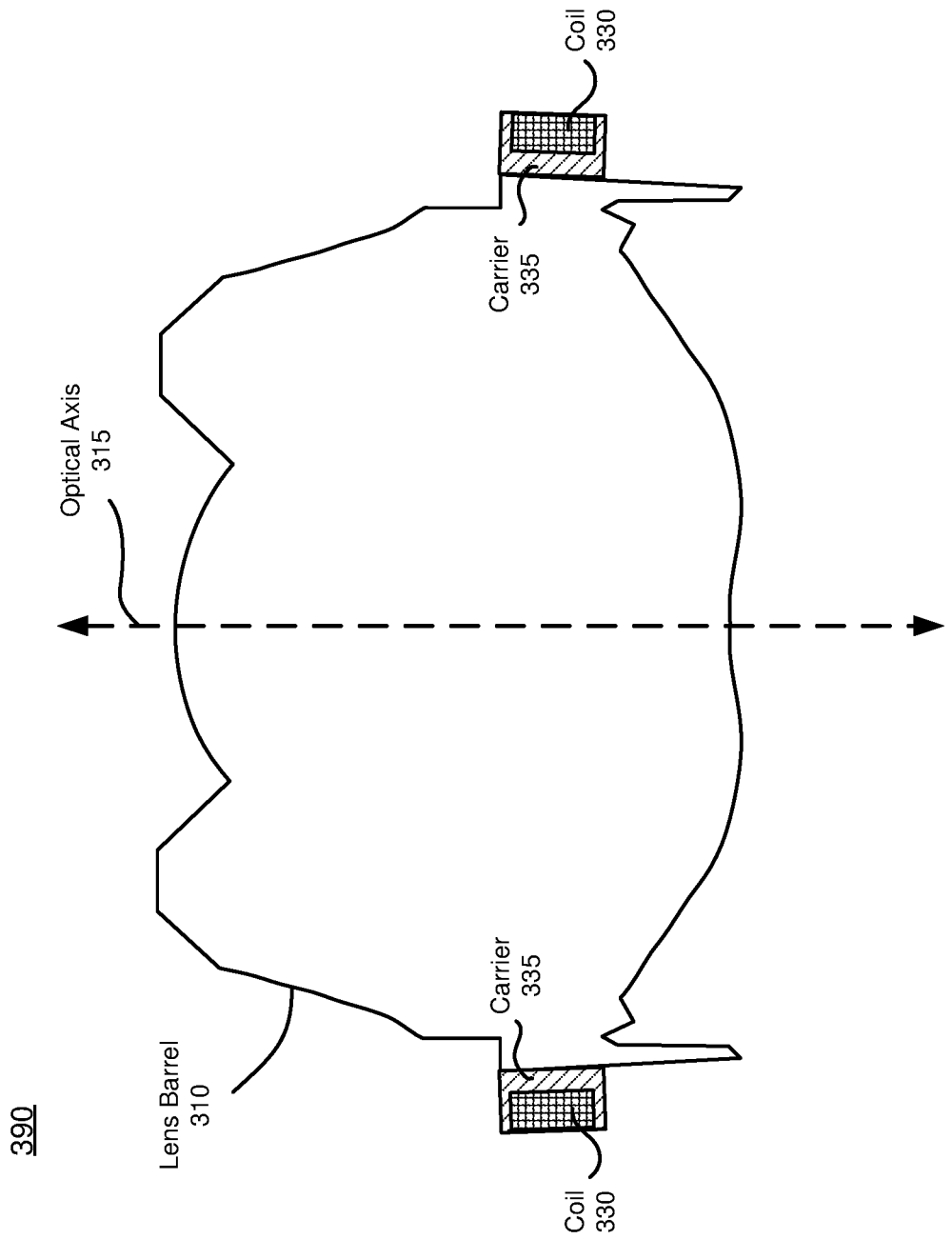
FIG. 3B is a cross section of a second lens barrel configuration that includes a carrier for the example camera assembly of FIG. 3A.

FIG. 3B is a cross section of a second lens barrel configuration 390 that includes a carrier for the example camera assembly 300 of FIG. 3A. The second lens barrel configuration 390 includes the lens barrel 310 and a carrier 335. The one or more auto focusing coils 330 and the barrel axis 315 are also illustrated in FIG. 3B. The lens barrel 310 and the one or more auto focusing coils 330 are substantially the same as the corresponding components described above in reference to FIG. 3A.

With the second lens barrel configuration 390, the carrier 335 is directly coupled to the lens barrel 310. For example, the carrier 335 comprises a first side in direct contact with a surface of the lens barrel 310 and a second side opposite the first side. In some embodiments, the carrier 335 is coupled to the lens barrel 310 by an adhesive. The one or more auto focusing coils 330 may be affixed to the second side of the carrier 335. The carrier 335 has a curvature that conforms to the curvature of the lens barrel 310. In some embodiments (not shown), more than one carrier 335 may be directly coupled to the lens barrel 310. In these embodiments, the number of carriers 335 may match a number of auto focusing coils 330 and the carriers 335 may be positioned at unique locations around the lens barrel 310 such that a carrier 335 is positioned between a corresponding coil 330 and the lens barrel 310. With the second lens barrel configuration 390, the restoring auto focusing springs 380 (not shown) may be coupled to the magnetic assembly 340 (not shown) and the carrier 335.

Figure 3C:
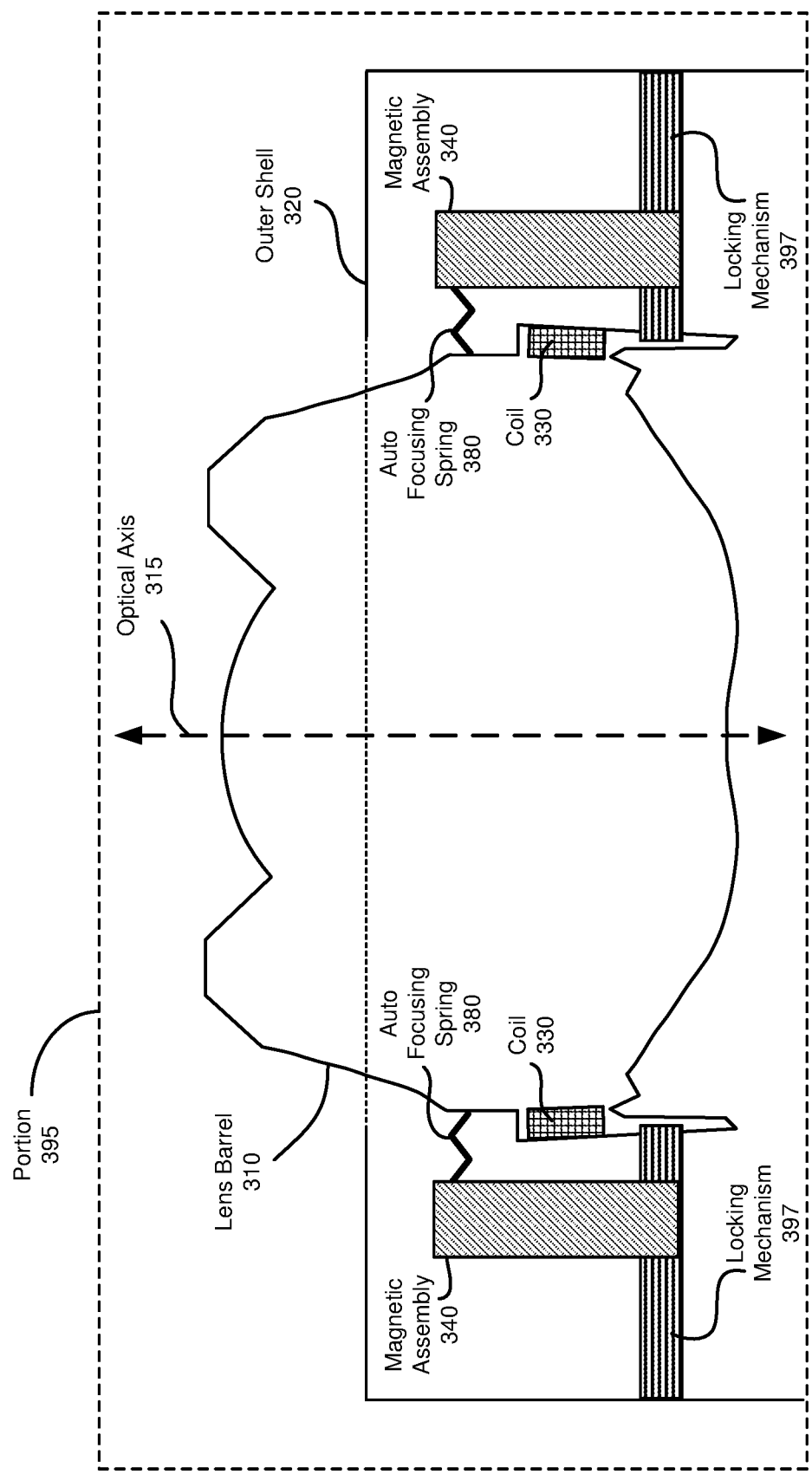
FIG. 3C is a cross section of a portion of the example camera assembly of FIG. 3A with a locking mechanism.

FIG. 3C is a cross section of a portion 395 of the example camera assembly 300 of FIG. 3A with a locking mechanism 397. As described above, the portion 395 of the camera assembly 300 includes the lens barrel 310, a portion of the outer shell 320, the one or more auto focusing coils 330, the magnetic assembly 340, and the plurality of restoring auto focusing springs 380. The portion 395 additionally includes one or more locking mechanisms 397.

Each locking mechanism 397 is configured to prevent the lens barrel 310 from moving in any direction parallel to or perpendicular to the optical axis 315. The locking mechanism 397 may have an engaged state and a disengaged state based on instructions from the controller 365. In the engaged stated the locking mechanism 397 locks the lens barrel 310 into its current position and in the disengaged state the locking mechanism 397 releases the lens barrel 310 such that the lens barrel 310 position can be adjusted by the focusing assembly and/or the stabilization assembly. The locking mechanism 397 is responsible for preventing the lens barrel 310 from coming into contact (e.g., high impact contact) with any other components (e.g., the sensor 350) of the camera assembly 300 during a drop event. A high impact contact may negatively affect the operation of the camera assembly 300. For example, the contact may cause one or more particles to break off of the lens barrel 310, the magnetic assembly 340, the stabilization platform 370, and/or the outer shell 320 and land on the sensor 350 (e.g., an IRCF filter of the sensor 350) affecting image quality of captured images. In another example, the contact may cause permanent damage to the lens barrel 310 and/or one or more of the lenses carried by the lens barrel 310.

The controller 365 determines instructions to provide to the locking mechanism 397 based on a rate of change of position measurements of the lens barrel 310 and/or a rate of change in position measurements of the camera assembly 300. The controller 365 may receive position measurements from the position sensor coupled to the stabilization platform 370 over time. The controller 365 may determine the rate of change of the position measurements (e.g., a velocity or an acceleration). The controller 365 may compare the rate of change to a threshold rate of change. The controller 365 may provide instructions to the locking mechanism 397 to prevent the lens barrel 310 from moving based on the comparison. For example, if the rate of change for the lens barrel 310 is greater than a threshold rate of change value, the controller 365 provides instructions to the locking mechanism 397 to engage and prevent the lens barrel 310 from moving and potentially coming into contact with another component of the camera assembly 300. The controller 365 may provide instructions to the locking mechanism to disengage and allow the lens barrel 310 to move once the rate of change is less than or equal to the threshold rate of change. In some embodiments, the controller 365 may provide instructions to the locking mechanism to disengage after a predetermined amount of time has passed since the rate of change became less than or equal to the threshold rate of change and continued to be less than or equal to the threshold rate of change.

In embodiments, where the camera assembly 300 is incorporated into an electronic device (e.g., a smartwatch), the electronic device may include an inertial measurement unit (IMU). The IMU is measuring a change in position, an orientation, and/or an acceleration of the electronic device and of the integrated camera assembly 300. The controller 365 of the camera assembly may receive a change in position measurement (e.g., of the electronic device and of the camera assembly) from the IMU. The controller 365 may compare the change in position measurement to a threshold measurement value. The controller 365 may provide instructions to the locking mechanism 397 to engage and prevent the lens barrel 310 from moving based on the comparison. For example, if the change in position measurement is greater than a threshold measurement value, the controller 365 provides instructions to the locking mechanism 397 to prevent the lens barrel 310 from moving. The controller 365 may provide instructions to the locking mechanism to disengage and allow the lens barrel 310 to move once the change in position measurement is less than or equal to the threshold measurement value. In some embodiments, the controller 365 may provide instructions to the locking mechanism to disengage after a predetermined amount of time has passed since the change in position measurement became less than or equal to the threshold measurement value and continued to be less than or equal to the threshold measurement value.

FIG. 4 is a cross-section of an example lens barrel 410, in accordance with one or more embodiments. The lens barrel 410 is an embodiment of the lens barrel 310. In the illustrated embodiment of FIG. 4, the lens barrel 410 carries three lenses (e.g., lens 420, lens 430, and lens 440). In other embodiments, the lens barrel 410 may include any number of lenses. The lenses 420, 430, 440 may be of any type. For example, lens 430 is illustrated as a bi-concave lens type. In other embodiments, the lenses 420, 430, 440 may be any combination of lens types including convex, concave, plano-convex, plano-concave, bi-convex, bi-concave, positive meniscus, negative meniscus, etc. The lens types describe the shape of the lens and in which direction the lens curves. In some embodiments, the lenses 420, 430, 440 may be apertures, Fresnel lenses, filters, any other suitable optical element, or any combination thereof. In some embodiments, the one or more lenses may all have the same diameters. In other embodiments, the one or more lenses may be of various sizes. The lenses 420, 430, 440 may be configured to direct and/or adjust light entering the lens barrel 410. For example, the lenses 420, 430, 440 may focus, magnify, stabilize, or perform some other type of adjustment on light that enters and passes through the lens barrel 410. In some embodiments, the lenses 420, 430, 440 direct and/or adjust light that is captured by a sensor (e.g., the sensor 350) that is positioned below the lenses 420, 430, 440 and lens barrel 410.

Figure 5:
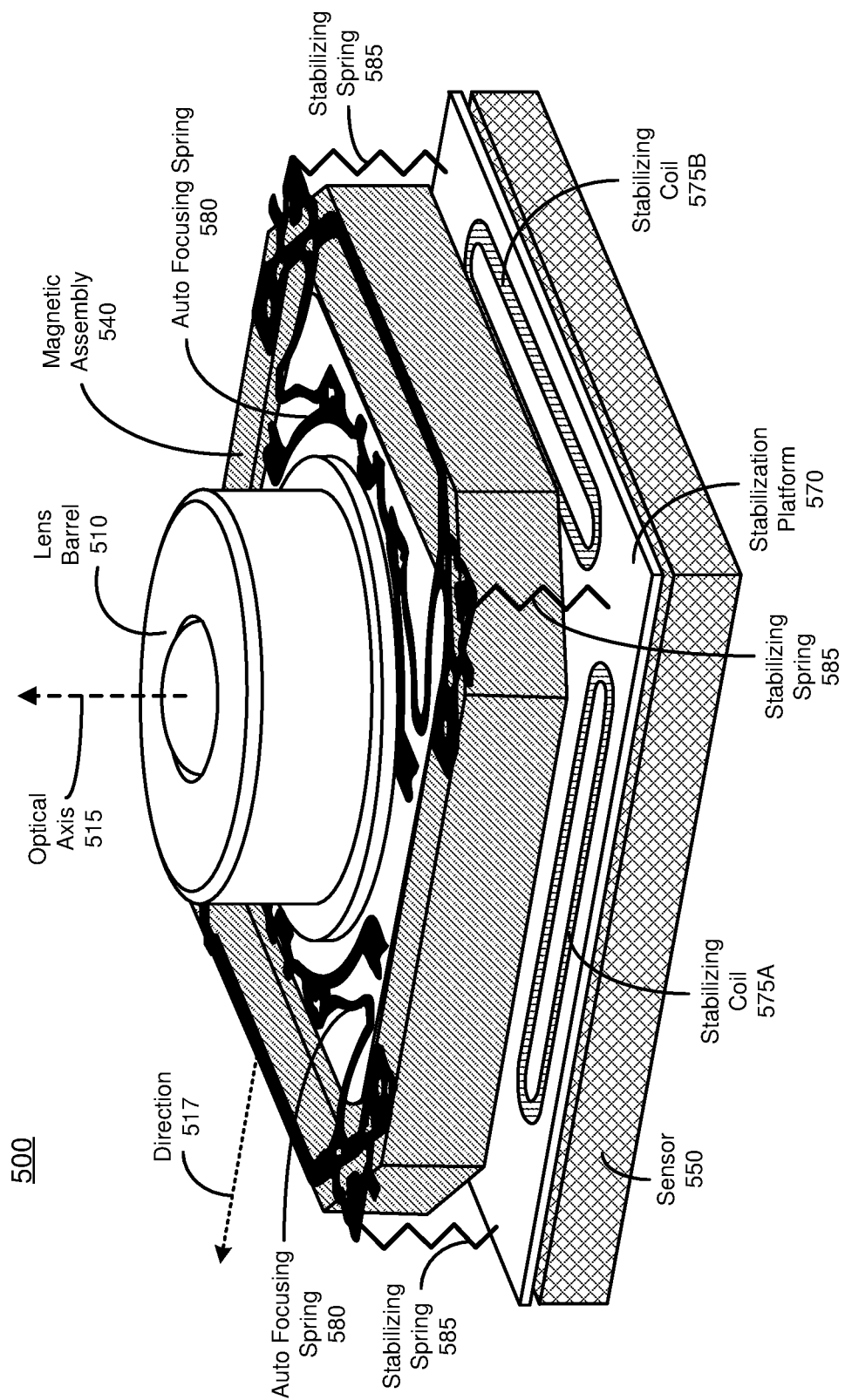
FIG. 5 is a perspective view of a second example camera assembly, in accordance with one or more embodiments.

FIG. 5 is a perspective view of a second example camera assembly 500, in accordance with one or more embodiments. The camera assembly 500 is an embodiment of the camera assembly 300 with the lens barrel 510 being an embodiment of the lens barrel 310, the magnetic assembly 540 being an embodiment of the magnetic assembly 340, the sensor 550 being an embodiment of the sensor 350, the plurality of restoring auto focusing springs 580 being an embodiment of the plurality of restoring auto focusing springs 380, and the plurality of stabilizing springs 585 being an embodiment of the plurality of stabilizing springs 385. The lens barrel 510 carries one or more lenses positioned along the optical axis 515. The stabilization platform 570 is an example embodiment of the stabilization platform 370. In FIG. 5, an outer shell for the camera assembly 500 is not shown so that the other components (e.g., the magnetic assembly 540, the plurality of restoring auto focusing springs 580, etc.) are visible.

The stabilization platform 570 includes a plurality of stabilizing coils 575 (e.g., a stabilizing coil 575A and a stabilizing coil 575B). The stabilization platform 570 may further include two additional stabilizing coils 575 that are not visible in the perspective view. In some embodiments, each stabilizing coil of the plurality of stabilizing coils 575 may be positioned below a corresponding magnet of the magnetic assembly 540. This embodiment is described in FIG. 6. Each stabilizing coil of the plurality of stabilizing coils 575 is structured to form a closed loop. The closed loop may be a race-track shape, a circular shape, an oval shape, a rectangular shape, etc. Any current supplied to a stabilizing coil 575A, 575B flows through and around the closed loop. A first side of the stabilizing coils 575 may sit flush against a surface of the stabilization platform 570. A second side of the stabilizing coils 575, opposite the first side, may face the magnetic assembly 540. As current is suppled to one or more of the stabilizing coils 575 and passes the magnetic fields generated by the plurality of magnets of the magnetic assembly 540, a Lorentz force drives the magnetic assembly 540 to move in one or more directions perpendicular to the optical axis 515. For example, by driving a particular amount of current through the stabilizing coil 575B, a magnetic field is produced that causes the magnetic assembly 540 to move in direction 517 (which is perpendicular to the optical axis 515), thereby causing the lens barrel 510 coupled to the magnetic assembly 540 to move in the same direction 517.

Figure 6:
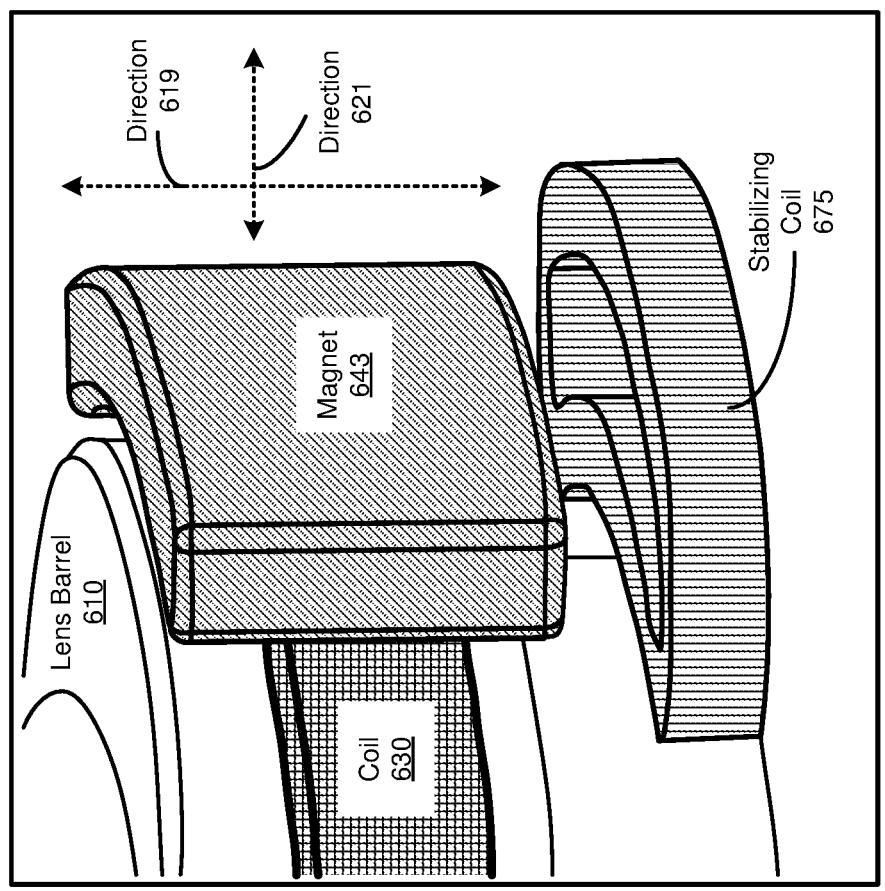
FIG. 6 is an example configuration of a stabilizing coil and an auto focusing coil of a camera assembly, in accordance with one or more embodiments.

FIG. 6 is an example configuration 600 of a stabilizing coil 675 and an auto focusing coil 630 of a camera assembly, in accordance with one or more embodiments. The example configuration 600 includes a lens barrel 610, the auto focusing coil 630, a magnet 643, and the stabilizing coil 675. In the example configuration 600, the stabilizing coil 675 is orthogonal to the one auto focusing coil 630 and is positioned below the magnet 643 of a magnetic assembly of the camera assembly. The magnet 643 is a curved magnet with a curvature conforming to a curvature of the auto focusing coil 630 and the lens barrel 610. The auto focusing coil 630 is a coil for conducting current that has been wrapped around the lens barrel 610 in either a clockwise or counterclockwise manner a number of times. As current is supplied to the auto focusing coil 630 and passes the magnetic field generated by the magnet 643 of the magnetic assembly, an orthogonal Lorentz force is created. The Lorentz force drives the auto focusing coil 630 to move in a direction 619 parallel to an optical axis, thereby causing the lens barrel 610 coupled to the auto focusing coil 330 to move in a similar direction 619. As current is supplied to the stabilizing coil 675 and passes the magnetic field generated by the magnet 643, another Lorentz force is created. This Lorentz force drives the magnetic assembly (including the magnet 643) and the lens barrel 610 in a direction 622 perpendicular to the optical axis.

Figure 7A:
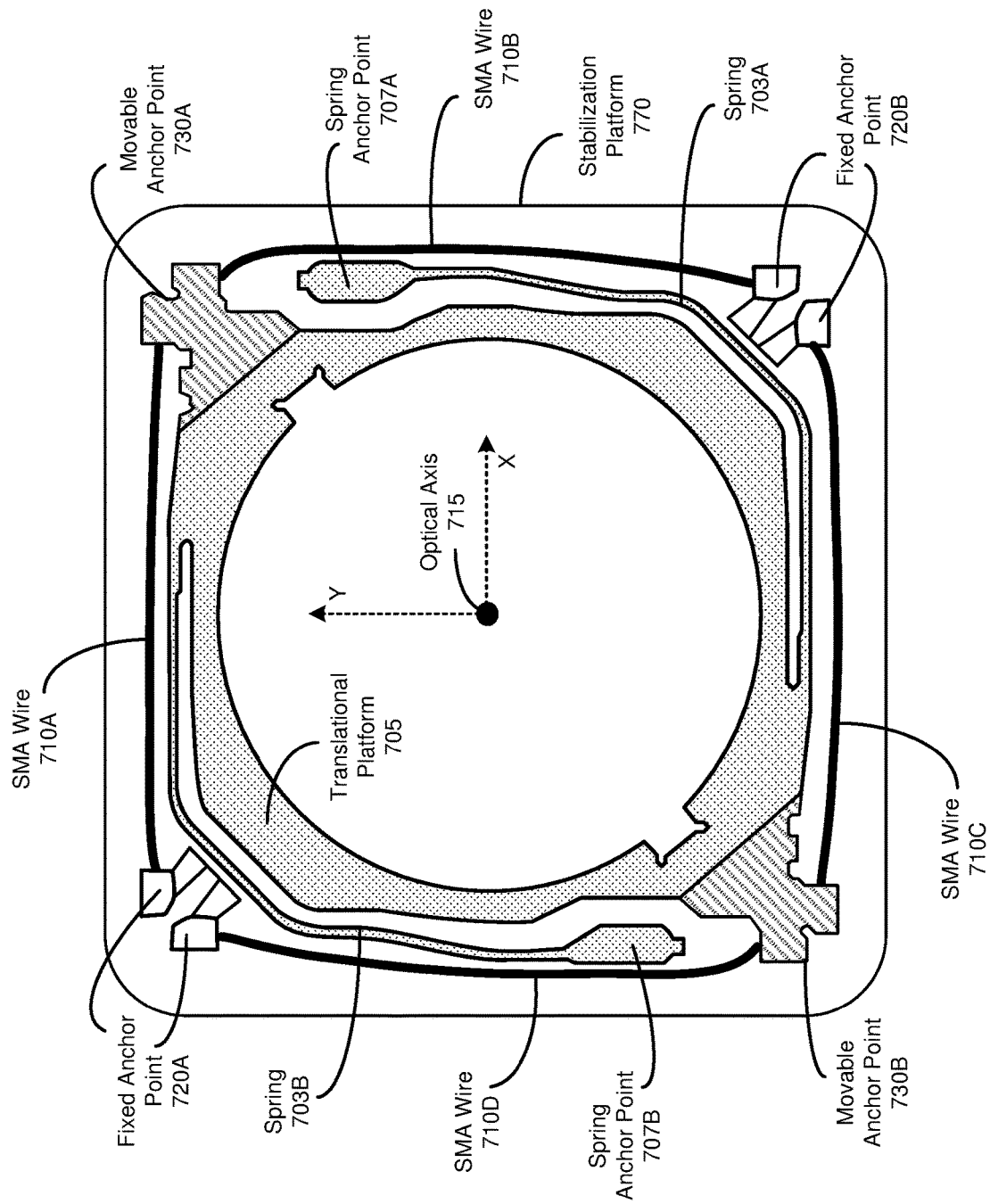
FIG. 7A is a top view of an example stabilization platform of a stabilization assembly, in accordance with one or more embodiments.

FIG. 7A is a top view of an example stabilization platform 770 of a stabilization assembly, in accordance with one or more embodiments. The stabilization platform 770 is an example embodiment of the stabilization platform 370 and an optical axis 715 is an example embodiments of the optical axis 315. The stabilization platform 770 includes an aperture that is rotationally symmetric about the optical axis 715. The aperture is located on an interior of the stabilization platform 770. The stabilization platform 770 may be a component of a camera assembly (e.g., the camera assembly 300) and the aperture provides a path for light from a lens barrel to a sensor. In some embodiments, the lens barrel may be in a first lens barrel configuration as described above in FIG. 3A. The stabilization platform 770 may be coupled to a printed circuit board (PCB) of the camera assembly.

The stabilization platform 770 includes a translational platform 705, a plurality of SMA wires 710 (e.g., a SMA wire 710A, a SMA wire 710B, a SMA wire 710C, and a SMA wire 710D), a plurality of springs 703 (e.g., a spring 703A and a spring 703B), a plurality of spring anchor points 707 (e.g., a spring anchor point 707A and a spring anchor point 707B), a plurality of fixed anchor points 720 (e.g., a fixed anchor point 720A and a fixed anchor point 720B), and a plurality of movable anchor points 730 (e.g., a movable anchor point 730A and a movable anchor point 730B). The translational platform 705 is positioned in a plane that is perpendicular to the optical axis 715. The translational platform 705 is configured to move in one or more directions perpendicular to the optical axis 715. The translational platform 705 may be coupled to the lens barrel such that when the translational platform 705 moves in a direction perpendicular to the optical axis 715, the lens barrel moves similarly. For example, the translational platform 705 may be coupled to a magnetic assembly (e.g., the magnetic assembly 340) that in turn is coupled to the lens barrel. The translational platform 705 includes the plurality of springs 703 and the plurality of spring anchor points 707. The plurality of springs 703 and the plurality of spring anchor points 707 are configured to control a positioning of the translational platform 705 in directions perpendicular to the optical axis 715. The spring anchor points 707 may be welded to the stabilization platform 770. In some embodiments, the plurality of springs 703 may control the positioning of the translational platform 705 such that when current is not supplied to the plurality of SMA wires 710 the translational platform 705 are in a neutral position. The plurality of springs 703 are designed such that a spring force is large enough to return the translational platform 705 to the neutral position without actuation of (e.g., without any current being supplied to) the plurality of SMA wires 710. The spring force of the plurality of springs 703 may provide a resistive force to prevent some or all rotational movement of the translational platform 705 (e.g., any rotation around the optical axis 715).

Each SMA wire 710A, 710B, 710C, 710D of the plurality of SMA wires 710 is coupled to the stabilization platform 770 via the plurality of fixed anchor points 720 and is coupled to the translational platform 705 via the plurality of movable anchor points 730. The plurality of fixed anchor points 720 and movable anchor points 730 align the plurality of SMA wires 710 such that the wires 710 are positioned in a same plane as the plane of the translational platform 705. The fixed anchor points 720 may be welded to the stabilization platform 770. The fixed anchor points 720 may provide an electrical connection for current to be supplied to the plurality of SMA wires 710.

Each SMA wire 710A, 710B, 710C, 710D of the plurality of SMA wires 710 is configured to contract when current is supplied to the SMA wire. The SMA wire 710A and the SMA wire 710C are considered a pair of SMA wires 710 (e.g., a first pair). The SMA wire 710B and the SMA wire 710D are considered another pair of SMA wires 710 (e.g., a second pair). By coupling an end of each SMA wire 710A, 710B, 710C, 710D to the fixed anchor points 720, when current is supplied to any or all of the SMA wires 710, those SMA wires 710 contract (becoming tauter) pulling against the fixed anchor points 720 and causing the translational platform 705 to move.

In an example implementation, an equal amount of current is supplied to the first pair of SMA wires 710 (i.e., to the SMA wire 710A and to the SMA wire 710C). Both SMA wire 710A and SMA wire 710C contract. In order to move the translational platform 705 in the positive x direction, more current is supplied to the SMA wire 710C and less current is supplied to the SMA wire 710A. The SMA wire 710C contracts more (becomes more taut) and pulls the movable anchor point 730B, the SMA wire 710A expands (becomes less taut), and the plurality of springs 703 provide a resistive force that prevents substantially all rotation of the translational platform 705 around the optical axis 715, and as a result the movable anchor point 730A moves in the positive x direction, thereby causing the translational platform 705 to move in the positive x direction.

A degree to which an SMA wire contracts is based on an amount of current supplied to that SMA wire. Amounts of current to be supplied and to which SMA wires 710 current is to be supplied to is determined by a controller (e.g., the controller 365). For example, during operation of the stabilization assembly, the controller determines a position for a lens barrel along a direction perpendicular to the optical axis 715. The position of the lens barrel provides stabilization for an image projected from a local area through the lens barrel onto a sensor (e.g., the sensor 350). In some embodiments, the controller determines which pair of SMA wires of a plurality of SMA wires to supply current and how much current to supply to each of the SMA wires of the pair for moving the lens barrel into the position. In some embodiments, the controller determines how much current to supply to each of the SMA wires of the plurality of SMA wires. In this embodiments, both pairs of SMA wires may be provided current. The controller provides instructions to supply amount(s) of current to a SMA wire, a pair of SMA wires, or all the SMA wires such that certain SMA wires contract or expand causing the platform together with the lens barrel to move into the position.

Figure 7B:
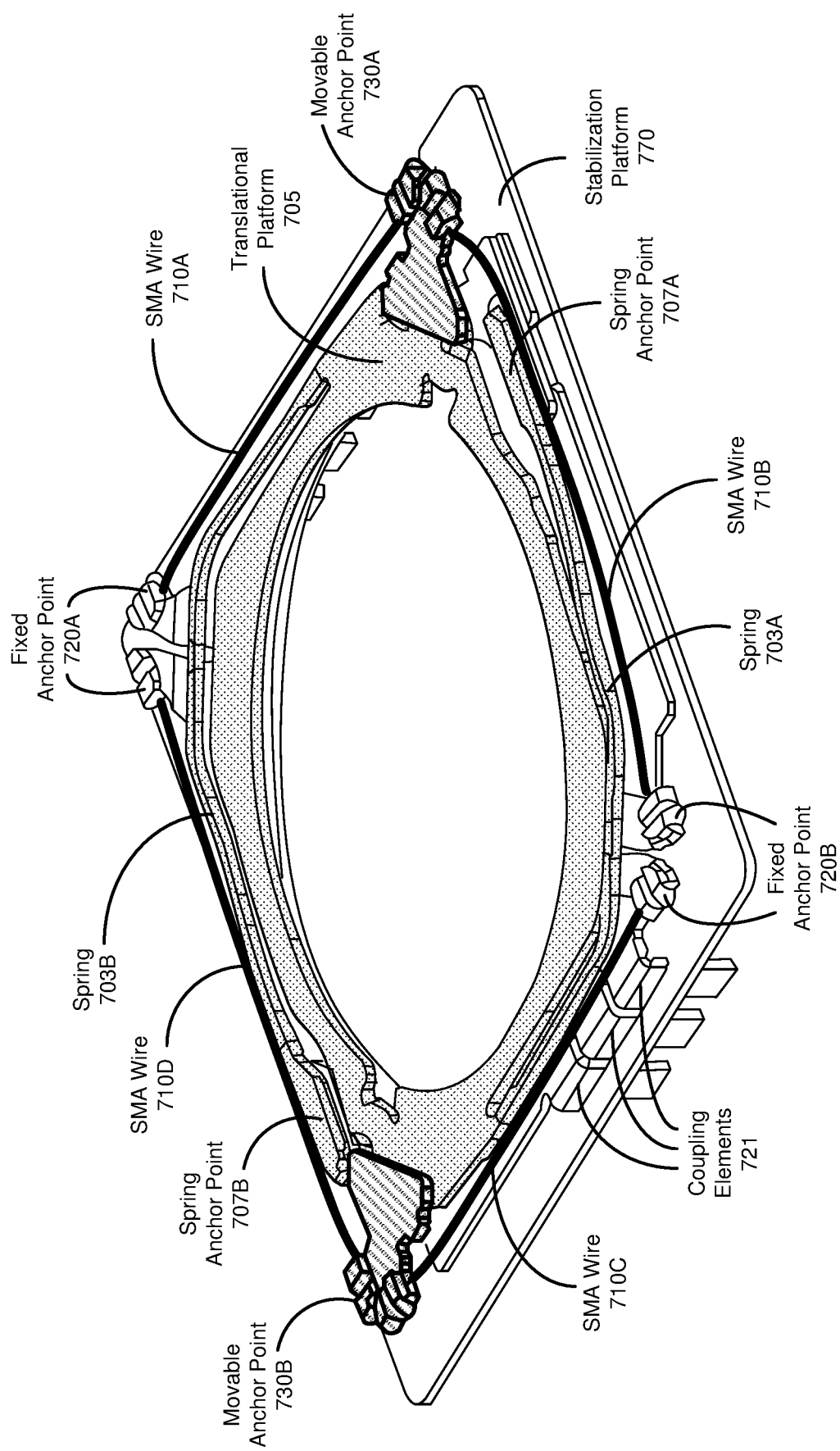
FIG. 7B is a perspective view of the example stabilization platform of FIG. 7A.

FIG. 7B is a perspective view of the example stabilization platform 770 of FIG. 7A. As can be seen in FIG. 7B, the plurality of fixed anchor points 720 are coupled to the stabilization platform 770 via one or more coupling elements 721. The coupling elements 721 may provide an electrical connection for current to be supplied to the SMA wires 710.

Figure 8B:
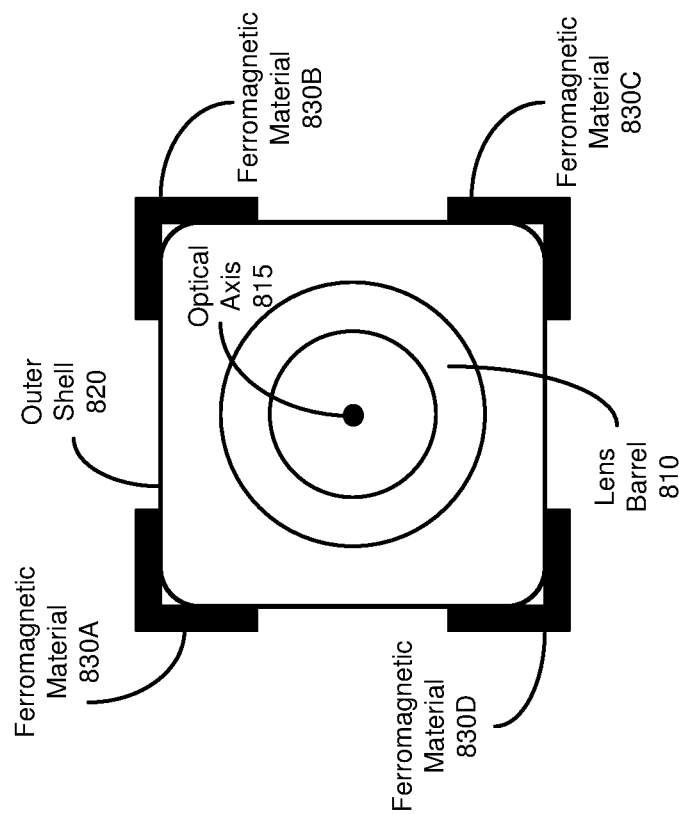
FIG. 8B is a top view of a second example configuration of ferromagnetic materials for the camera assembly of FIG. 8A.
Figure 8A:
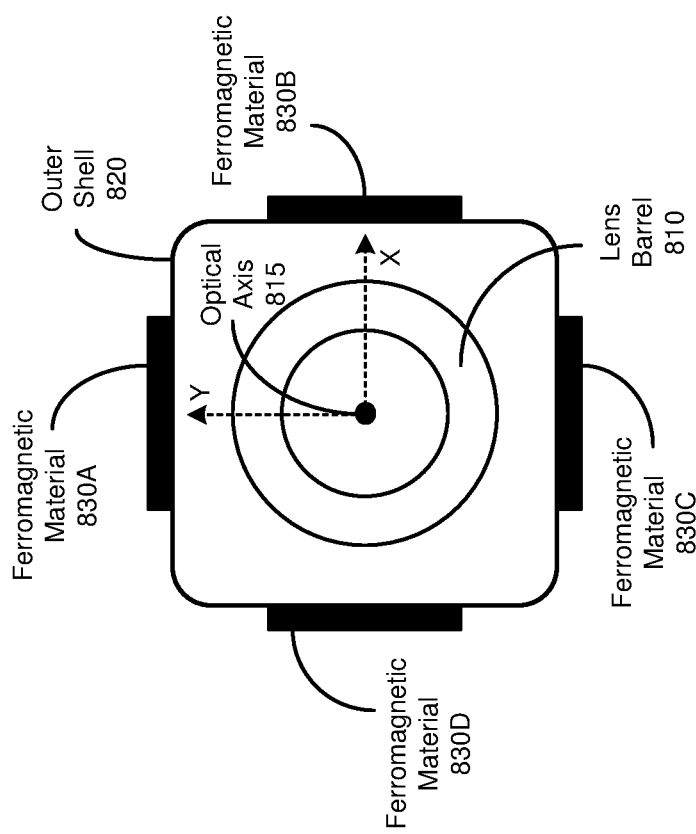
FIG. 8A is a top view of a first example configuration of ferromagnetic materials for a camera assembly, in accordance with one or more embodiments.

FIG. 8A is a top view of a first example configuration of ferromagnetic materials 830 for a camera assembly, in accordance with one or more embodiments. The camera assembly may be an embodiment of the camera assembly 300 or the camera assembly 500 and depicts a lens barrel 810, an outer shell 820, and an optical axis 815.

The pieces of ferromagnetic materials 830 (e.g., a piece of ferromagnetic material 830A, a piece of ferromagnetic material 830B, a piece of ferromagnetic material 830C, and a piece of ferromagnetic material 830D) are positioned symmetrically about the optical axis 815. For example, the outer shell 820 is rectangular with six sides with two sides opposing each other and including an aperture and the other four sides being located in a plane that is parallel to the optical axis 815. In FIG. 8A, a piece of ferromagnetic material of the pieces of ferromagnetic materials 830 is positioned on a surface of each of the four sides.

The pieces of ferromagnetic materials 830 are coupled to the outer shell 820. In some embodiments, the pieces of ferromagnetic materials 830 may be coupled to the outer shell 820 on an outside surface of the outer shell 820. In other embodiments (not shown), the pieces of ferromagnetic materials 830 may be coupled to the outer shell 820 on an interior surface of the outer shell 820. The pieces of ferromagnetic materials 830 may be coupled to the outer shell 820 by attaching the pieces of ferromagnetic materials 830 directly to the surface of the outer shell 820, e.g., via welding and/or via epoxy.

The pieces of ferromagnetic materials 830 function to enhance the magnetic field generated by a plurality of magnets of a magnetic assembly of the camera assembly. An amount of augmentation of the magnetic field is based on one or more parameters of each piece of ferromagnetic material 830A, 830B, 830C, 830D. The one or more parameters describe each piece of ferromagnetic material and may include a size of each piece, a position of each piece on the outer shell 820, and a material type of each piece. The material type describes what material the ferromagnetic material is composed of, e.g., 400 series stainless steel alloys. In some embodiments, other types of ferrous metals with plating (e.g., to prevent rust and/or corrosion) may be used. One or more pieces of ferromagnetic materials 830 may be sized, positioned on the outer shell 820, and/or composed of certain material type to reduce an amount of current supplied to one or more stabilizing coils of the camera assembly. It is important to note that the pieces of ferromagnetic materials 830 augment the magnetic field of a magnetic assembly of the camera assembly caused by the magnetic assembly's interaction with the current supplied to the one or more stabilizing coils. The augmentation is such that less current is needed to translate the lens barrel 810 in one or more directions perpendicular to the optical axis 815 than would be required if there were no pieces of ferromagnetic materials on the outer shell 820. Accordingly, the pieces of ferromagnetic materials 830 act to increase an efficiency (i.e., more translation for less current) of image stabilization. A portion of an amount of translation experienced by the lens barrel 810 in a camera assembly that includes one or more pieces of ferromagnetic materials 830 is based on a value of the magnetic field produced by the magnetic assembly and a value of augmentation of the magnetic field due to the one or more pieces of ferromagnetic materials 830.

In some embodiments (not shown), the camera assembly may include only one piece of ferromagnetic material (e.g., the piece of ferromagnetic material 830D) coupled to the outer shell 820. The one or more parameters for the piece of ferromagnetic material 830D are selected such that an amount of current supplied to the one or more stabilizing coils to translate the magnetic assembly together with the lens barrel 810 to an extreme position in a negative x direction is less than an amount of current supplied to the one or more stabilizing coils to translate the magnetic assembly together with the lens barrel 810 to an extreme position in a positive y direction. Both the x and y directions are perpendicular to the optical axis 815. The x direction is perpendicular to the plane of the side of the outer shell 820 with the piece of ferromagnetic material 830D.

FIG. 8B is a top view of a second example configuration of ferromagnetic materials 830 for the camera assembly of FIG. 8A. The illustrated configuration in FIG. 8B is substantially similar to the configuration in FIG. 8A except that each piece of ferromagnetic material 830A, 830B, 830C, 830D is positioned on a surface of each corner of the outer shell 820.

Figure 8C:
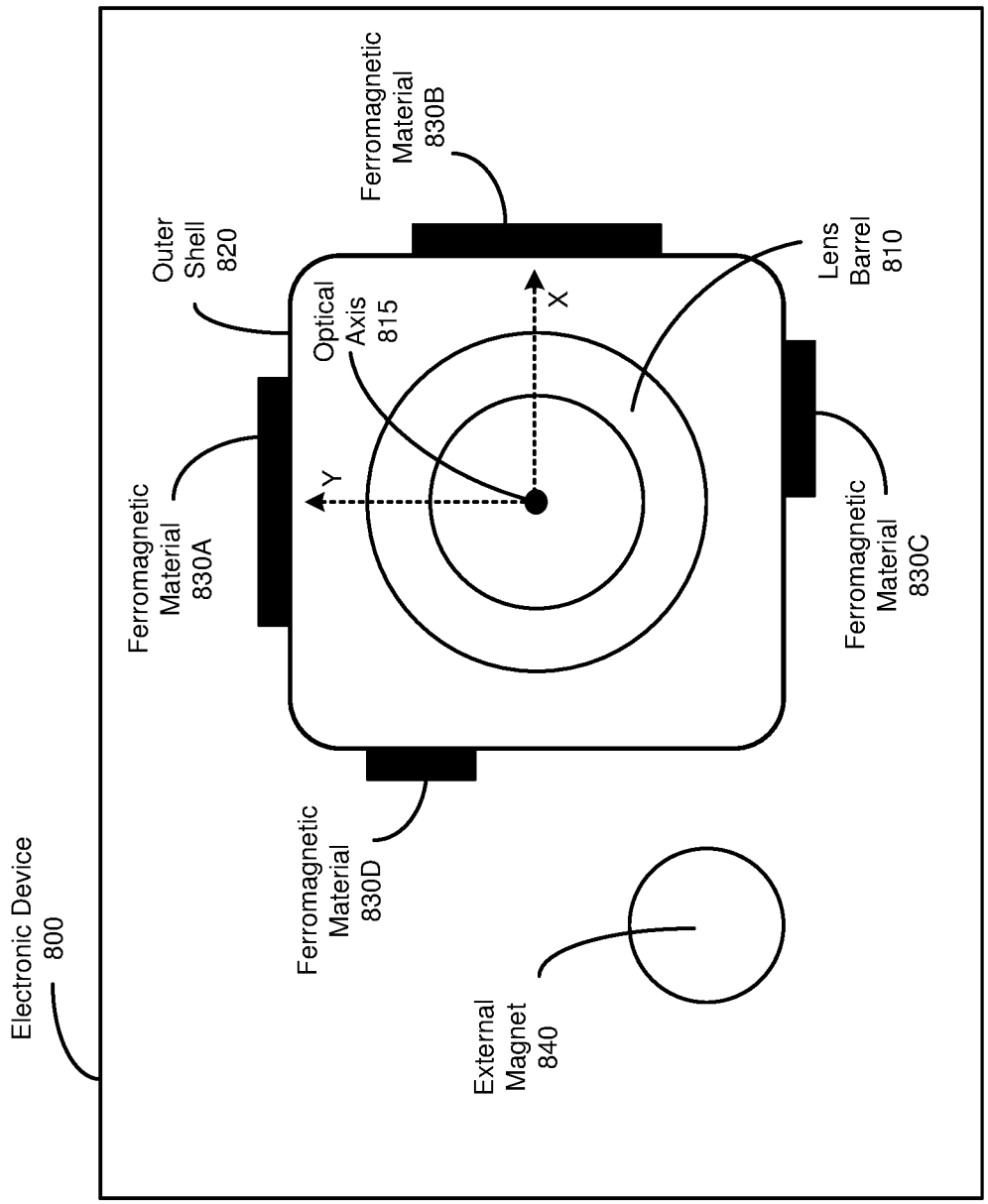
FIG. 8C is a top view of a third example configuration of ferromagnetic materials for the camera assembly of FIG. 8A.

FIG. 8C is a top view of a third example configuration of ferromagnetic materials 830 for the camera assembly of FIG. 8A. An external magnet 840 is a magnet that is external to (not a part of) the camera assembly. For example, the external magnet 840 may be a component of a haptic device, a charging port, a speaker, or some other component of an electronic device 800 (e.g., a wristband system 100, 200) that includes the camera assembly. As illustrated in FIG. 8C, the external magnet 840 may be positioned adjacent to a side of the outer shell 820. The external magnet 840 generates an external magnetic field. In electronic devices 800 with small form factor where a distance between the external magnet 840 and the camera assembly (e.g., the outer shall 820) is relatively small, the external magnetic field, if not accounted for, can interfere with the magnetic field produced by the interaction of the magnetic assembly with current being supplied to one or more stabilizing coils. For example, the external magnetic field generated by the external magnet 840 may augment (such as, increase or decrease a strength of) the magnetic field produced.

The one or more parameters of each piece of ferromagnetic material 830A, 830B, 830C, 830D (e.g., the size, the position, the material type, or some combination thereof) may be customized based on a strength of the external magnet 840 (e.g., based on how much the external magnetic field augments the magnetic field produced by the magnetic assembly). As illustrated in FIG. 8C, one or more parameters of each piece of ferromagnetic material 830A, 830B, 830C, 830D is customized. For example, the external magnetic field of the external magnet 840 works against (e.g., by decreasing the strength of) the magnetic field produced by the magnetic assembly on the sides of the outer shell 820 where the piece of ferromagnetic material 830A and the piece of ferromagnetic material 830B are coupled. As such, the piece of ferromagnetic material 830A and the piece of ferromagnet material 830B are sized (i.e., larger) and positioned (i.e., centered along the sides) similarly to counteract the external magnetic field. In the same example, the external magnetic field of the external magnet 840 adds to (e.g., by increasing the strength of) the magnetic field produced by the magnetic assembly on a side of the outer shell 820 where the piece of ferromagnetic material 830C is coupled and on a side of the outer shell 820 where the piece of ferromagnetic material 830D is coupled. As such, the piece of ferromagnetic material 830C is sized to be smaller than the pieces 830A, 830B and the piece of ferromagnetic material 830D is sized to be smaller than the pieces 830A, 830B, 830C. And, the pieces 830C, 830D are positioned such that the pieces of ferromagnetic materials 830 are not centered along the corresponding sides on the outer shell 820. With the magnetic field produced by the magnetic assembly being augmented by the external magnet field of the external magnet 840 and by the pieces of ferromagnetic materials 830, an amount of current supplied to one or more stabilizing coils to translate the magnetic assembly together with the lens barrel 810 in a x direction, y direction, or combination of both is less than an amount of current that would be needed for a similar translation if the external magnet 840 and/or the pieces of ferromagnetic materials 830 were not present.

A focusing assembly of the camera assembly may be calibrated after the camera assembly is incorporated into the electronic device 800 so that any augmentations to the magnetic field, such as augmentations caused by one or more external magnets 840 in the electronic device 800, are considered.

FIG. 9 is a flowchart illustrating a process 900 for calibrating a focusing assembly of a camera assembly, in accordance with one or more embodiments. The process 900 is performed after the camera assembly is incorporated into an electronic device (e.g., the electronic device 800). The process shown in FIG. 9 may be performed by a controller (e.g., the controller 365) of a camera assembly (e.g., the camera assembly 300). Other entities may perform some or all of the steps in FIG. 9 in other embodiments. Embodiments may include different and/or additional steps or perform the steps in different orders.

The controller determines 910 a plurality of different positions for a lens barrel corresponding to one or more axes perpendicular (e.g., an x axis and a y axis) to an optical axis. The axes (the x and y axes) may define a plane over which the lens barrel may translate. In some embodiments, the plurality of different positions is a plurality of different lateral positions. For example, the controller may determine a grid of a discrete lateral positions in both the x and y directions.

The controller provides 920 instructions to a stabilization assembly including an amount of current to be supplied to one or more stabilizing coils such that a magnetic assembly together with the lens barrel moves into each of the plurality of different positions along the one or more axes. For example, the controller provides instructions that position the magnetic assembly together with the lens barrel at each of the discrete lateral positions in the grid. At each of the discrete lateral positions of the grid, the controller actuates the lens barrel over a series of translational positions in a direction parallel to the optical axis. For example, the controller may provide instructions to a focusing assembly to supply current to one or more auto focusing coils that cause the lens barrel to move into each of the translational positions of the series of translational positions. For example, when the lens barrel is at a discrete lateral position in both the x and y directions, the controller provides instructions that position the lens barrel at each of the discrete translational positions in the series prior to the lens barrel being moved to another discrete lateral position in the x and y directions. Once all the discrete translational positions in the series have taken place for a specific lateral position, the controller may determine if there are any other lateral positions in which the lens barrel is to be positioned. If there are, the controller provides instructions to the stabilization assembly including an amount of current to be supplied to one or more stabilizing coils such that the magnetic assembly together with the lens barrel moves into the next lateral position. The controller then actuates the lens barrel over the series of translational positions in the direction parallel to the optical axis.

The controller receives 930 augmented magnetic field measurements from a magnetic field sensor when the magnetic assembly together with the lens barrel is positioned at each different position (i.e., at each different lateral and translational position). For example, the controller may receive augmented magnetic field measurements from a magnetic field sensor that is coupled to a stabilization platform of the camera assembly. The controller receives 950 augmented field measurements from the magnetic field sensor due to the camera assembly including at least one piece of ferromagnetic material and/or due to the camera assembly being incorporated into an electronic device that includes at least one external magnet (e.g., the external magnet 840).

The controller calibrates 940 an amount of current supplied to the one or more auto focusing coils to cause translation of the lens barrel along the optical axis. For example, the controller identifies the amount of current that was needed to cause the lens barrel to move into each of the translational positions of the series of translational positions at each of the lateral positions.

The process 900 is beneficial as typical calibration process take place in camera assemblies prior to placement (or incorporation) of the camera assemblies into an electronic device. By performing the process 900 when the camera assembly is already incorporated into the electronic device, any augmentations to the magnetic field, such as augmentations caused by external magnets in the electronic device, are taken into consideration. Thus, accurate amounts of current needed to move the lens barrel in directions parallel to the optical axis can be determined for the focusing assembly.

Figure 10B:
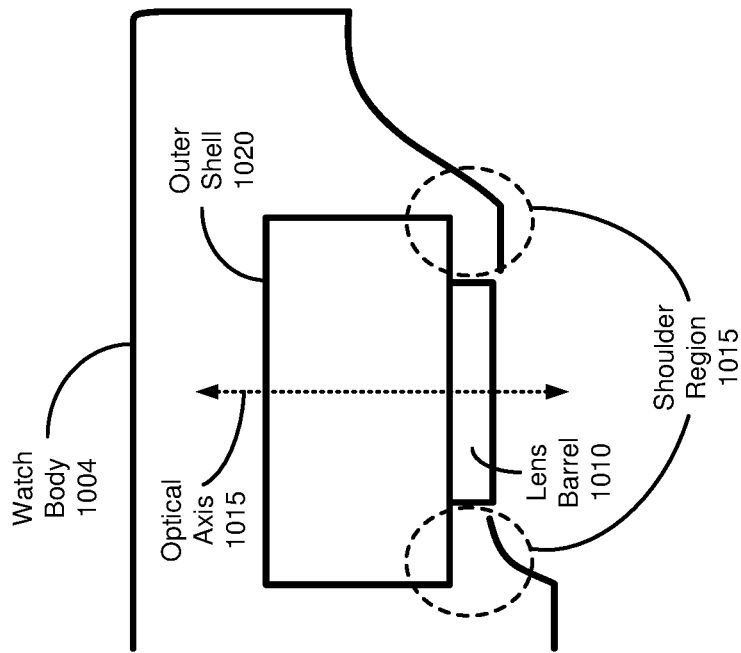
FIG. 10B is a side view of the camera assembly incorporated into the wristband system of FIG. 10A.
Figure 10A:
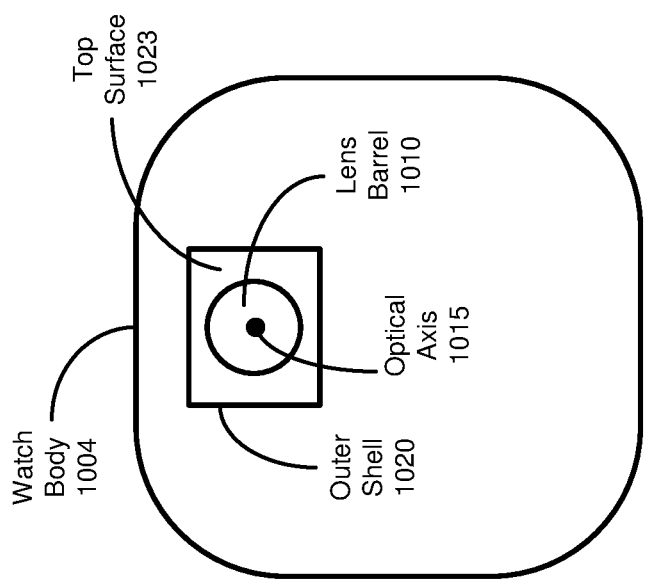
FIG. 10A is a top view of a camera assembly incorporated into a wristband system, in accordance with one or more embodiments.

FIG. 10A is a top view of a camera assembly incorporated into a wristband system, in accordance with one or more embodiments. The camera assembly is an embodiment of the camera assembly 300 or the camera assembly 500. A lens barrel 1010, an optical axis 1015, and an outer shell 1020 of the camera assembly is depicted in FIG. 10A. The outer shell 1020 includes a top surface 1023 that faces a local area surrounding the camera assembly (and wristband system).

The wristband system is an embodiment of the wristband system 100, 200. A watch body 1004 of the wristband system is depicted in FIG. 10A. In some embodiments, the camera assembly is a rear-facing camera device (e.g., the rear-facing camera device 115B). In some embodiments (not shown), the camera assembly is a front-facing camera device (e.g., the front-facing camera device 115A).

FIG. 10B is a side view of the camera assembly incorporated into the wristband system of FIG. 10A. The camera assembly is coupled to the wristband system by incorporating the camera assembly into the watch body 1004. In some embodiments, the top surface 1023 of the outer shell 1020 of the camera assembly is coupled to (e.g., affixed to, mounted to, attached to, etc.) an interior surface of the watch body 1004 at a shoulder region 1015. As designs for the wristband system are of a small form factor, the shoulder region 1015 provides a limited amount of space where the outer shell 1020 can be coupled to the watch body 1004 without affecting the form factor of the wristband system. Several examples for incorporating the camera assembly into the watch body 1004 are described below in more detail with reference to FIGS. 10C-10E.

Figure 10C:
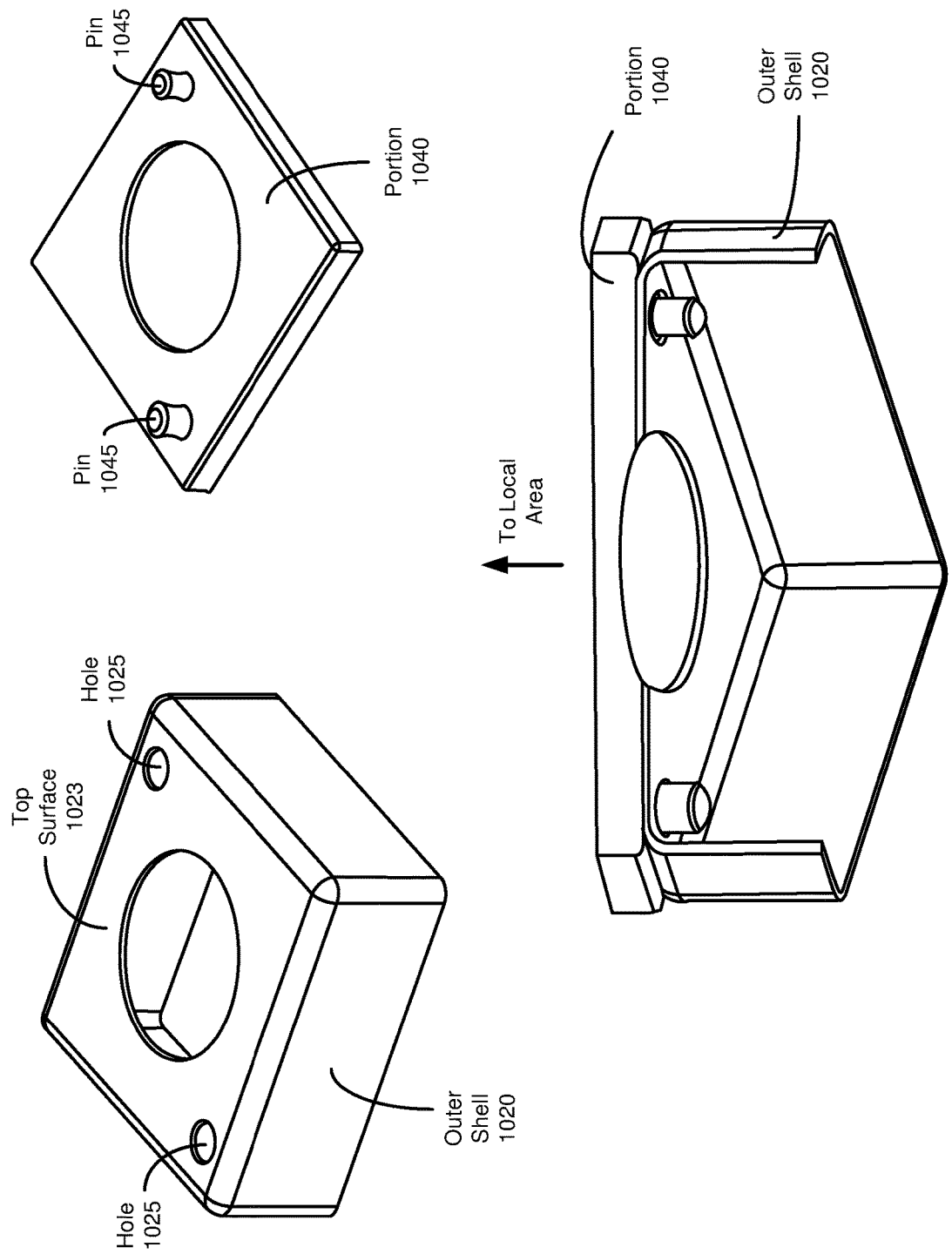
FIG. 10C is a first example configuration for incorporating the camera assembly into the wristband system of FIG. 10A.

FIG. 10C is a first example configuration for incorporating the camera assembly into the wristband system of FIG. 10A. In this example configuration, the outer shell 1020 includes a plurality of holes 1025 on the top surface 1023 of the outer shell 1020. In some embodiments, the top surface 1023 includes two holes 1025. In other embodiments (not shown), the top surface 1023 includes any number of holes 1025. As illustrated in FIG. 10C, a hole of the plurality of holes 1025 may be located adjacent to each corner of the top surface 1023 of the outer shell 1020.

A portion 1040 of the watch body 1004 is also illustrated in FIG. 10C. The portion 1040 includes a plurality of pins 1045. The number of pins 1045 on the portion 1040 corresponds to the number of holes 1025 on the top surface 1023. The pins 1045 extend outward (orthogonally away from) a surface of the portion 1040. The surface is an interior surface of the watch body 1004. The outer shell 1020 is coupled to the portion 1040 of the watch body 1004 via the pins 1045 being fitted into the holes 1025 (i.e., each hole receives a pin) such that the top surface 1023 of the outer shell 1020 faces the local area. The pins 1045 and corresponding holes 1025 are located in the shoulder region 1015 described above. The surface of the portion 1040 and/or the top surface 1023 of the outer shell 1020 may be coated with an epoxy for securing the outer shell 1020 to the potion 1040. In some embodiments, the pins 1045 are coated with the epoxy.

Figure 10D:
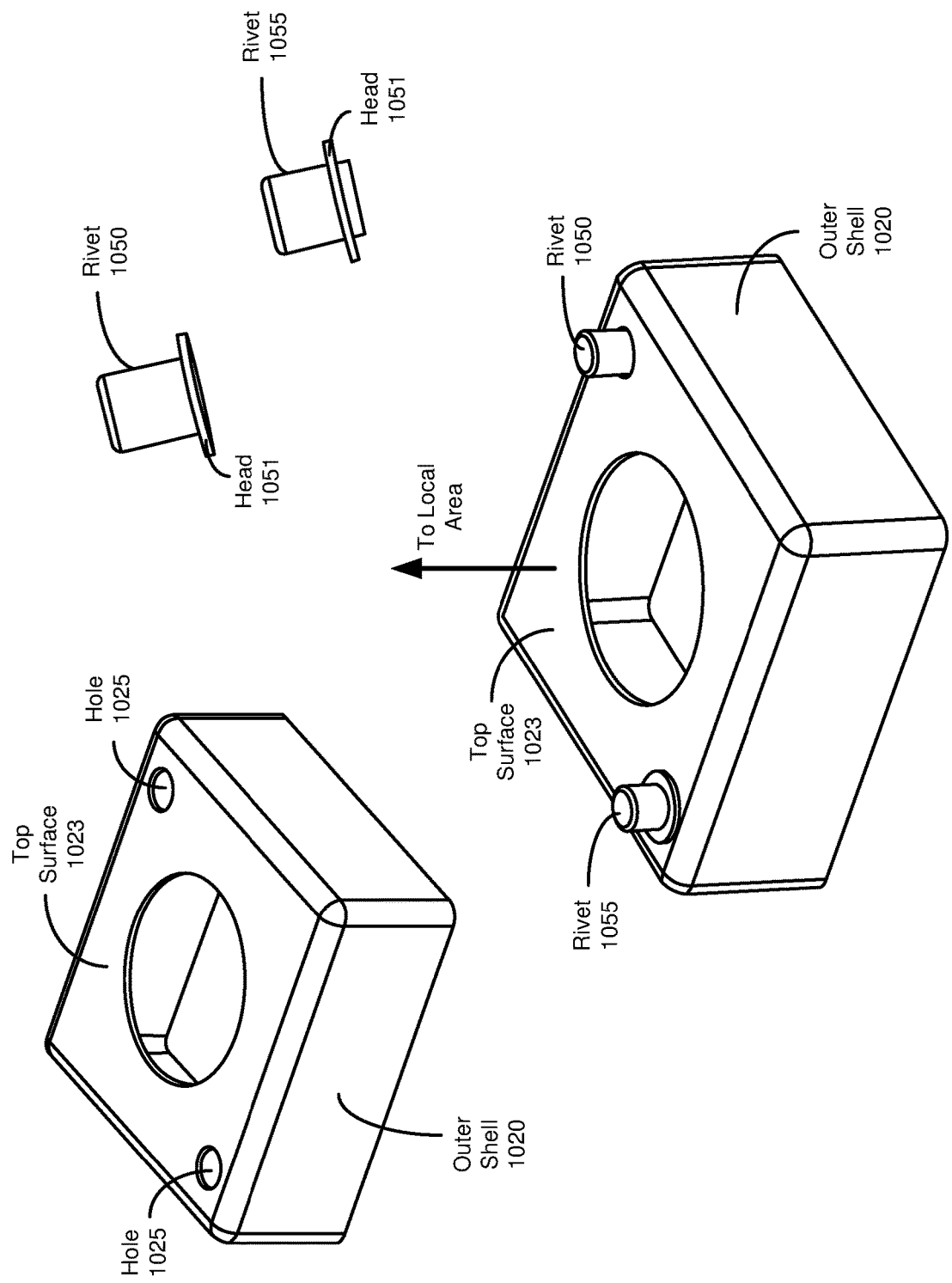
FIG. 10D is a second example configuration for incorporating the camera assembly into the wristband system of FIG. 10A.

FIG. 10D is a second example configuration for incorporating the camera assembly into the wristband system of FIG. 10A. In this example configuration, the outer shell 1020 is configured in a similar manner to the outer shell 1020 described above with reference to FIG. 10C. A rivet 1050 and a rivet 1055 are also illustrated in FIG. 10D. The rivet 1050 includes a flat head 1051 at one end of the rivet 1050. The rivet 1055 includes the flat head 1051 at a location other than the end of the rivet 1055. The rivets 1050, 1055 are configured to couple to the outer shell 1020 at the holes 1025 in the top surface 1023. The rivets 1050, 1055 are also configured to couple to the watch body 1004 such that the top surface 1023 of the outer shell 1020 faces the local area. In some embodiments, only rivets 1050 are used. In some embodiments, only rivets 1055 are used. In some embodiments, a combination of rivets 1050 and rivets 1055 are used. As can be seen in FIG. 10D, the head 1051 of rivet 1050 couples to an underside of the top surface 1023 of the outer shell 1020 and the head 1051 of rivet 1055 couples to a topside of the top surface 1023 of the outer shell 1020. The rivets 1050 and/or rivets 1055 and corresponding holes 1025 are located in the shoulder region 1015 described above. Rivet 1050 and/or rivet 1055 may be spot welded onto the outer shell 1020.

Figure 10E:
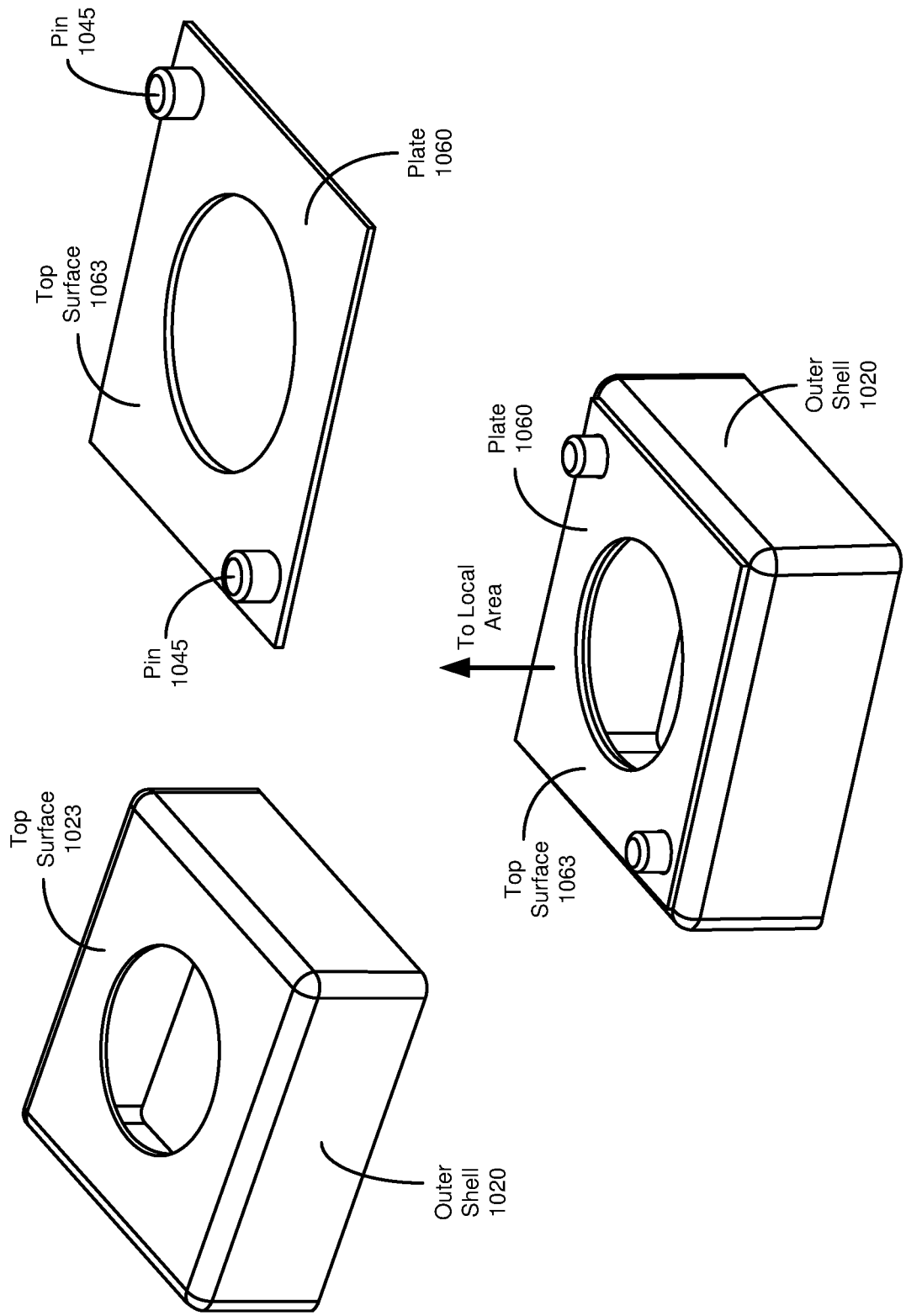
FIG. 10E is a third example configuration for incorporating the camera assembly into the wristband system of FIG. 10A.

FIG. 10E is a third example configuration for incorporating the camera assembly into the wristband system of FIG. 10A. In this example configuration, the outer shell 1020 has a solid top surface 1023 besides an aperture for a lens barrel of the camera assembly. A plate 1060 is also illustrated in FIG. 10E. The plate 1060 includes pins 1045 that extend outward from a top surface 1063. The plate 1060 is configured to couple to the outer shell 1020 and the pins 1045 are configured to couple to the watch body 1004 such that the top surface 1063 of the plate 1060 faces the local area. The pins 1045 are located in the shoulder region 1015 described above. The plate 1060 may be manufactured from a wide variety of materials ranging from plastic to metals. In embodiments, where the plate 1060 is plastic, the plate 1060 may be coupled to the top surface 1023 of the outer shell 1020 via epoxy. In embodiments, where the plate 1060 is metal, the plate 1060 may be coupled to the top surface 1023 of the outer shell 1020 via welding.

In another example configuration (not shown), at least two metal brackets may be welded onto at least two sides of the outer shell 1020 where one metal bracket is welded onto one side. The sides of the outer shell 1020 that may receive a metal bracket are sides that are orthogonal to side that includes the top surface 1023. The metal brackets are configured to couple the outer shell 1020 to various interior surfaces of the watch body 1004.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A stabilization assembly comprising:
   a lens barrel configured to carry a lens that is positioned along an optical axis;
   a magnetic assembly including a plurality of magnets that produce a magnetic field;
   one or more stabilizing coils coupled to a printed circuit board below the plurality of magnets;
   an outer shell including an aperture through which the lens barrel can actuate, the outer shell at least partially enclosing the one or more stabilizing coils; and
   a piece of ferromagnetic material that is coupled to a surface of the outer shell, the piece of ferromagnetic material positioned to augment the magnetic field,
   wherein current supplied to the one or more stabilizing coils interacts with the augmented magnetic field to cause the magnetic assembly together with the lens barrel to translate in a direction perpendicular to the optical axis.

2. The stabilization assembly of claim 1, further comprising:
   one or more stabilizing springs that couple the magnetic assembly to the printed circuit board, the one or more stabilizing springs configured to control a positioning of the magnetic assembly with the lens barrel in one or more directions perpendicular to the optical axis, and
   wherein the magnetic assembly and the lens barrel have a neutral positioning when no current is supplied to the one or more stabilizing coils.

3. The stabilization assembly of claim 1, wherein the stabilization assembly is integrated into an electronic device that includes an external magnet positioned external to the outer shell, and the augmented magnetic field is based in part on one or more parameters describing the piece of ferromagnetic material and an external magnetic field of the external magnet.

4. The stabilization assembly of claim 3, wherein the one or more parameters of the piece of ferromagnetic material include a position of the piece, a size of the piece, and a material type of the piece.

5. The stabilization assembly of claim 1, wherein the one or more stabilizing coils includes a set of stabilizing coils, and current supplied to the set of stabilizing coils has a current value to cause the magnetic assembly together with the lens barrel to translate in a direction perpendicular to the optical axis, wherein a portion of the amount of translation is based on a value of the magnetic field, and a remaining portion of the amount of translation is based on a value of augmentation of the magnetic field due to the piece of ferromagnetic material.

6. The stabilization assembly of claim 1, further comprising:
a plurality of pieces of ferromagnetic materials coupled to the outer shell, each piece of the plurality of pieces is positioned to augment the magnetic field, and
wherein the lens barrel is rotationally symmetric about the optical axis, and wherein a piece of the plurality of pieces is positioned around the optical axis on the outer shell.

7. The stabilization assembly of claim 1, further comprising:
a plurality of pieces of ferromagnetic materials coupled to the outer shell, each piece of the plurality of pieces is positioned to augment the magnetic field, and
wherein the outer shell is rectangular with five sides, wherein a side of the five sides includes an aperture and four of the five sides are each located in a plane that is parallel to the optical axis, and wherein a piece of the plurality of pieces of ferromagnetic materials is positioned on a surface of each of the four sides of the rectangular outer shell.

8. The stabilization assembly of claim 7, wherein the stabilization assembly is integrated into an electronic device that includes an external magnet positioned external to and adjacent to one of the four sides of the outer shell, the external magnet augments the magnetic field, and wherein one or more parameters of the piece of ferromagnetic material that is coupled to the surface of the side adjacent to the external magnet is selected such that an amount of current supplied to the one or more stabilizing coils to translate the magnetic assembly together with the lens barrel to an extreme position in a first direction is less than an amount of current supplied to the one or more stabilizing coils to translate the magnetic assembly together with the lens barrel to an extreme position in a second direction, wherein the first direction and the second direction are perpendicular and the first direction is perpendicular to the plane of the side of the outer shell with the piece of ferromagnetic material.

9. The stabilization assembly of claim 1, wherein the lens is configured to focus light from a local area onto a sensor, and wherein an amount of current supplied to the one or more stabilizing coils stabilizes an image being projected onto the sensor.

10. A camera assembly comprising:
a sensor configured to capture data describing a local area; and
a stabilization assembly comprising:
a lens barrel configured to carry a lens that focuses light from the local area and is positioned along an optical axis;
a magnetic assembly including a plurality of magnets that produce a magnetic field;
one or more stabilizing coils coupled to a printed circuit board below the plurality of magnets;
an outer shell including an aperture through which the lens barrel can actuate, the outer shell at least partially enclosing the one or more stabilizing coils; and
a piece of ferromagnetic material that is coupled to a surface of the outer shell, the piece of ferromagnetic material positioned to augment the magnetic field,
wherein current supplied to the one or more stabilizing coils interacts with the augmented magnetic field to cause the magnetic assembly together with the lens barrel to translate in a direction perpendicular to the optical axis thereby stabilizing the data captured by the sensor.

11. The camera assembly of claim 10, further comprising:
a controller configured to:
determine a position of the lens barrel along one or more axes perpendicular to the optical axis needed to focus light from the local area onto the sensor such that data is captured by the sensor; and
provide instructions to the stabilization assembly including an amount of current to be supplied to the one or more stabilizing coils such that the magnetic assembly together with the lens barrel moves into the position.

12. The camera assembly of claim 10, further comprising:
a focusing assembly comprising:
one or more auto focusing coils coupled to the lens barrel; and
one or more restoring auto focusing springs that couple the magnetic assembly to the lens barrel, the one or more restoring auto focusing springs are configured to control a positioning of the lens barrel along the optical axis,
wherein current supplied to the one or more auto focusing coils interacts with the augmented magnetic field to cause an amount of translation of the lens barrel in a direction parallel to the optical axis.

13. The camera assembly of claim 12, the camera assembly further comprising:
a magnetic field sensor coupled to the printed circuit board, the magnetic field sensor is configured to measure the augmented magnetic field when the lens barrel is positioned at a plurality of different positions relative to the optical axis; and
a controller configured to:
determine the plurality of different positions for the lens barrel corresponding to one or more axes perpendicular to the optical axis;
provide instructions to the stabilization assembly including an amount of current to be supplied to the one or more stabilizing coils such that the magnetic assembly together with the lens barrel moves into each of the plurality of different positions along the one or more axes;
receive the augmented magnetic field measurements from the magnetic field sensor when the magnetic assembly together with the lens barrel is positioned at each different position; and
calibrate an amount of current supplied to the one or more auto focusing coils to cause translation of the lens barrel along the optical axis.

14. The camera assembly of claim 13, wherein an external magnet is positioned external to the outer shell, and the augmented magnetic field is based on an external magnetic field of the external magnet.

15. The camera assembly of claim 12, wherein the one or more restoring auto focusing springs are conductors and couple to the one or more auto focusing coils to supply the current to the one or more auto focusing coils.

16. The camera assembly of claim 10, further comprising:
one or more stabilizing springs that couple the magnetic assembly to the printed circuit board, the one or more stabilizing springs configured to control a positioning of the magnetic assembly with the lens barrel in a direction perpendicular to the optical axis,
wherein the magnetic assembly and the lens barrel have a neutral positioning when no current is supplied to the one or more stabilizing coils.

17. The camera assembly of claim 10, wherein the camera assembly is integrated into an electronic device that includes an external magnet positioned external to the outer shell, and the augmented magnetic field is based in part on one or more parameters describing the piece of ferromagnetic material and an external magnetic field of the external magnet.

18. The camera assembly of claim 17, wherein the one or more parameters of the piece of ferromagnetic material include a position of the piece, a size of the piece, and a material type of the piece.

19. The camera assembly of claim 10, wherein the one or more stabilizing coils includes a set of stabilizing coils, and current supplied to the set of stabilizing coils has a current value to cause the magnetic assembly together with the lens barrel to translate in a direction perpendicular to the optical axis, wherein a portion of the amount of translation is based on a value of the magnetic field, and a remaining portion of the amount of translation is based on a value of augmentation of the magnetic field due to the piece of ferromagnetic material.

20. A wearable device comprising:
an external magnet that produces an external magnetic field;
a sensor configured to capture data describing a local area;
a lens barrel configured to carry a lens that focuses light from the local area and is positioned along an optical axis;
a magnetic assembly including a plurality of magnets that produce a magnetic field;
one or more stabilizing coils coupled to a printed circuit board below the plurality of magnets;
an outer shell including an aperture through which the lens barrel can actuate, the outer shell at least partially enclosing the one or more stabilizing coils; and
a piece of ferromagnetic material that is coupled to a surface of the outer shell,
wherein current supplied to the one or more stabilizing coils interacts with an augmented magnetic field to cause the magnetic assembly together with the lens barrel to translate in a direction perpendicular to the optical axis, and wherein the augmented magnetic field is based in part on the piece of ferromagnetic material and the external magnetic field thereby stabilizing the data captured by the sensor.

* * * * *